Figure 13:
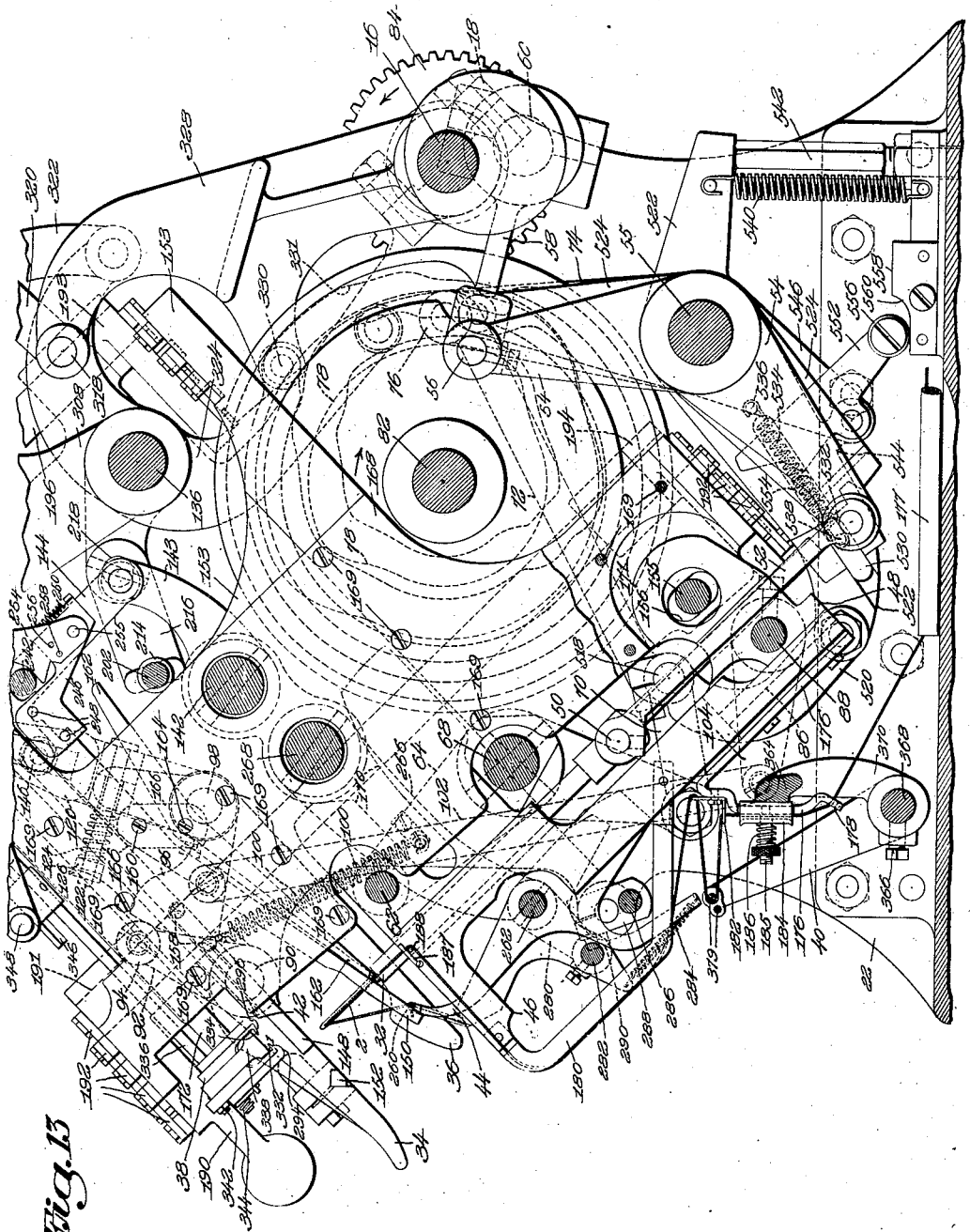

Jan. 25, 1938.　　　　J. FOSSA　　　　2,106,320
MACHINE FOR LACING SHOE UPPERS
Filed May 11, 1935　　　24 Sheets-Sheet 1
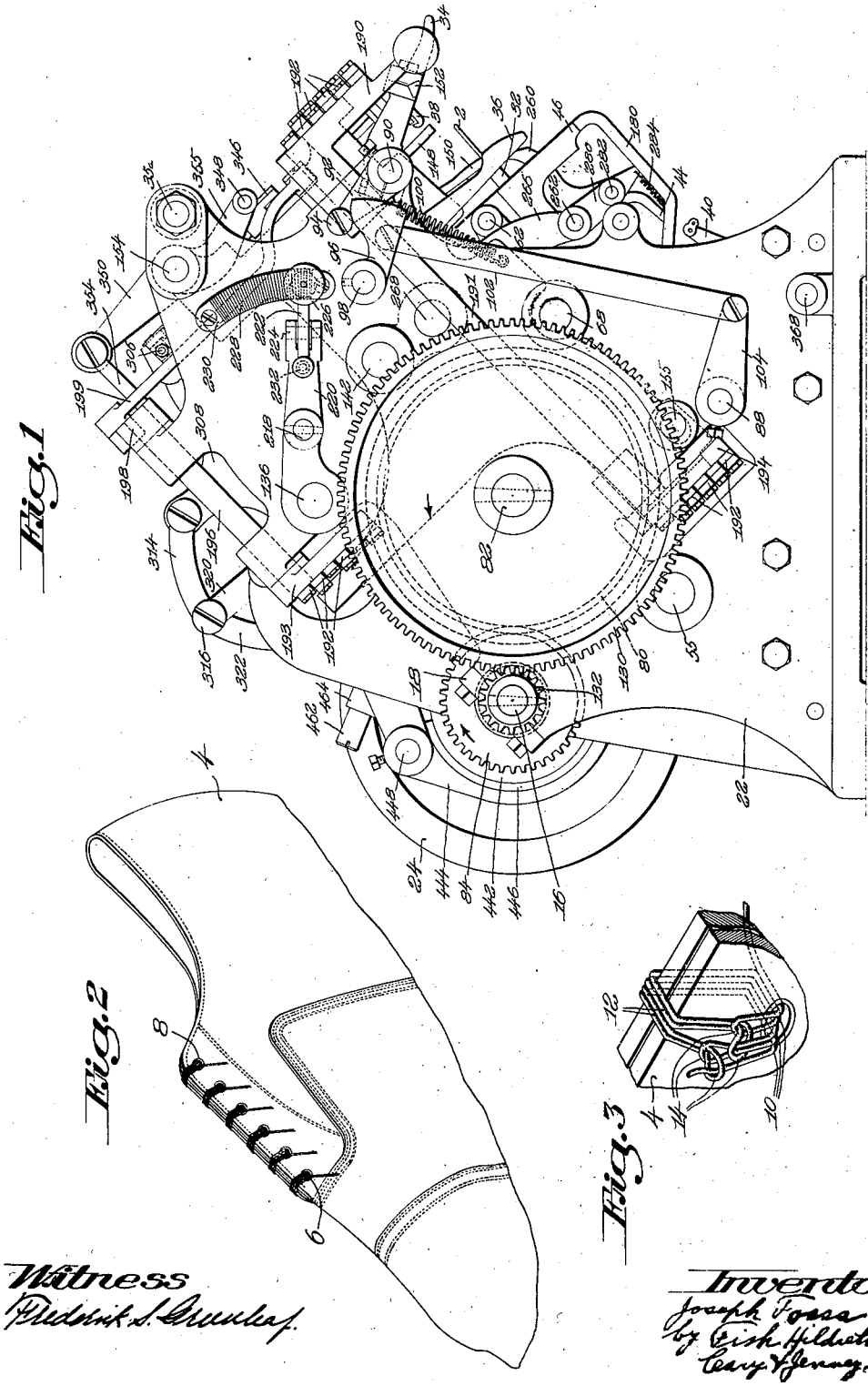

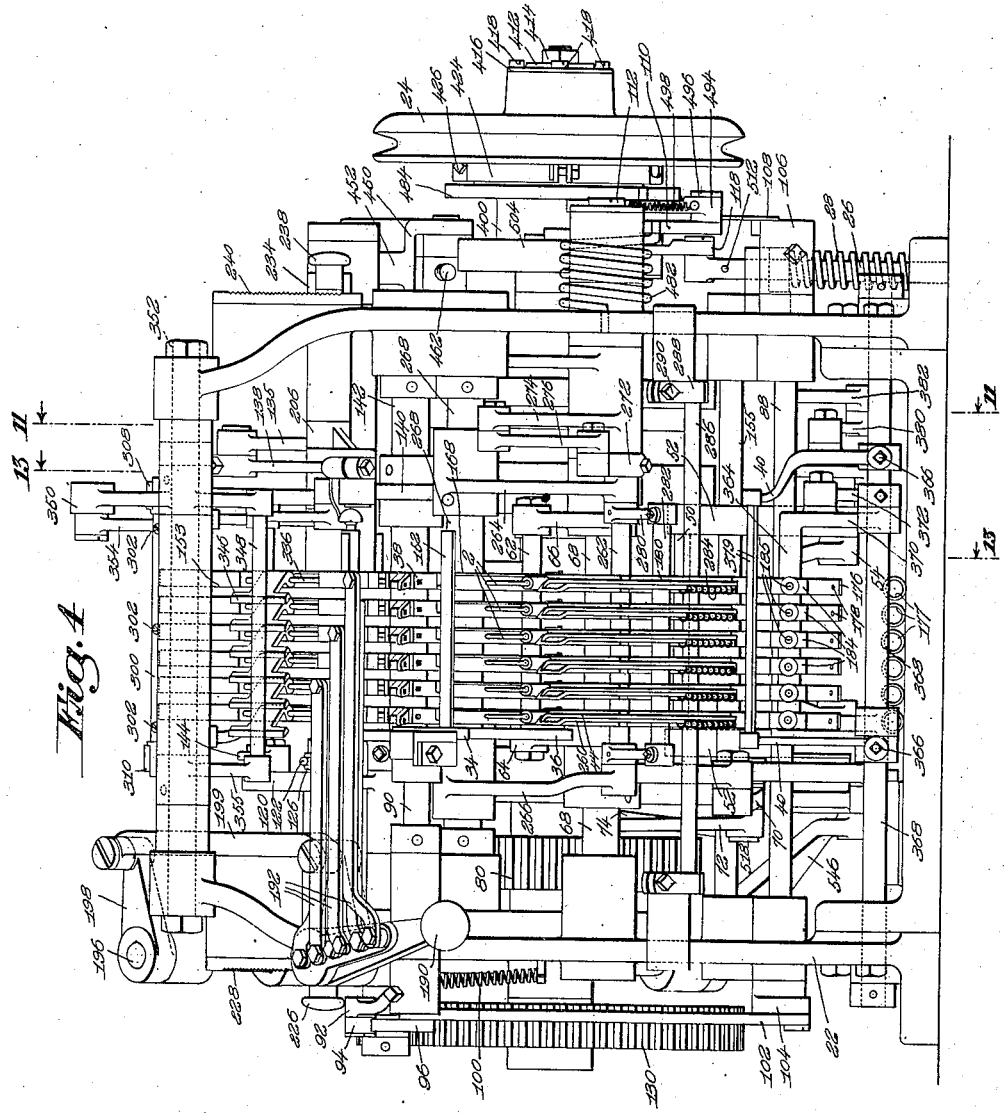

Jan. 25, 1938.  J. FOSSA  2,106,320
MACHINE FOR LACING SHOE UPPERS
Filed May 11, 1935  24 Sheets-Sheet 3
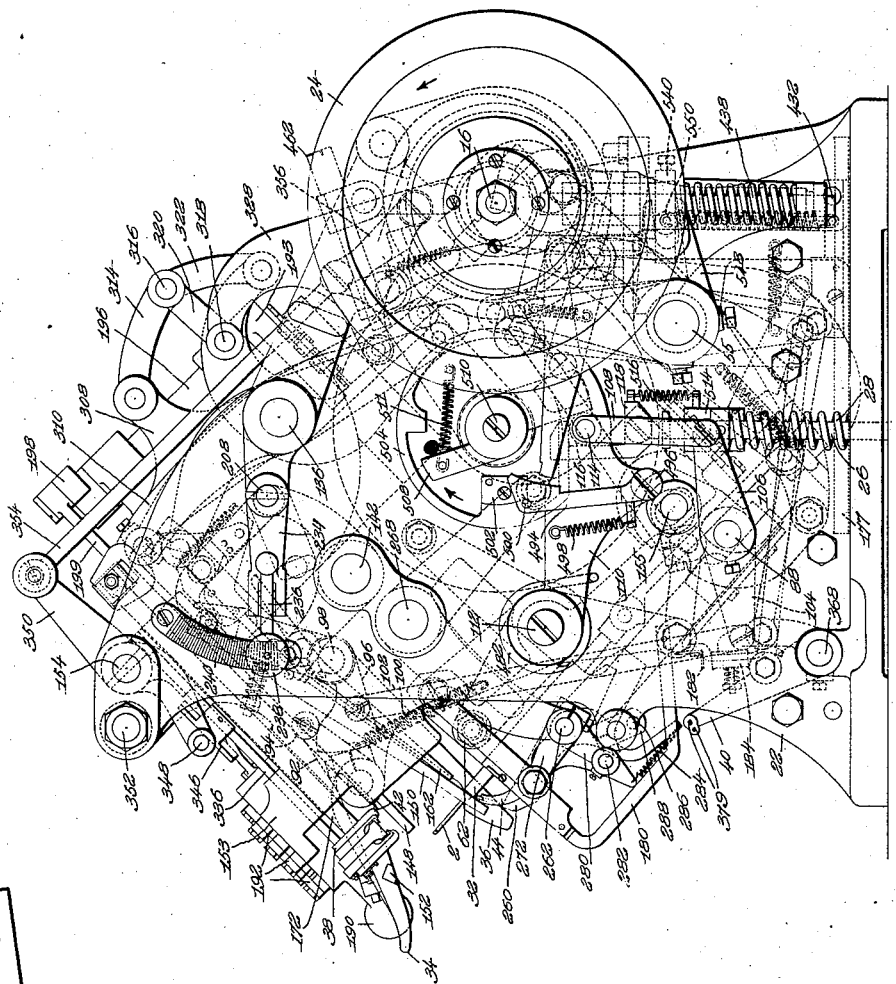
Fig. 5
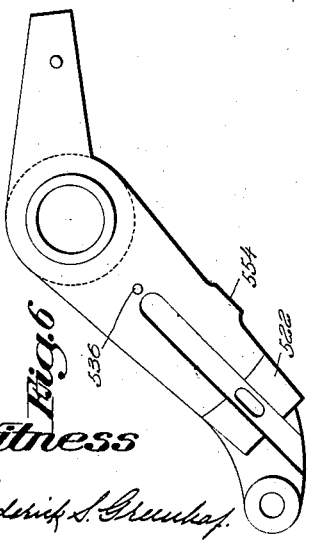
Fig. 6
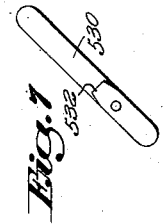
Fig. 7
Fig. 8
Witness
Frederick S. Greenleaf
Inventor
Joseph Fossa
by Fish Hildreth
Cary & Jenney Attys

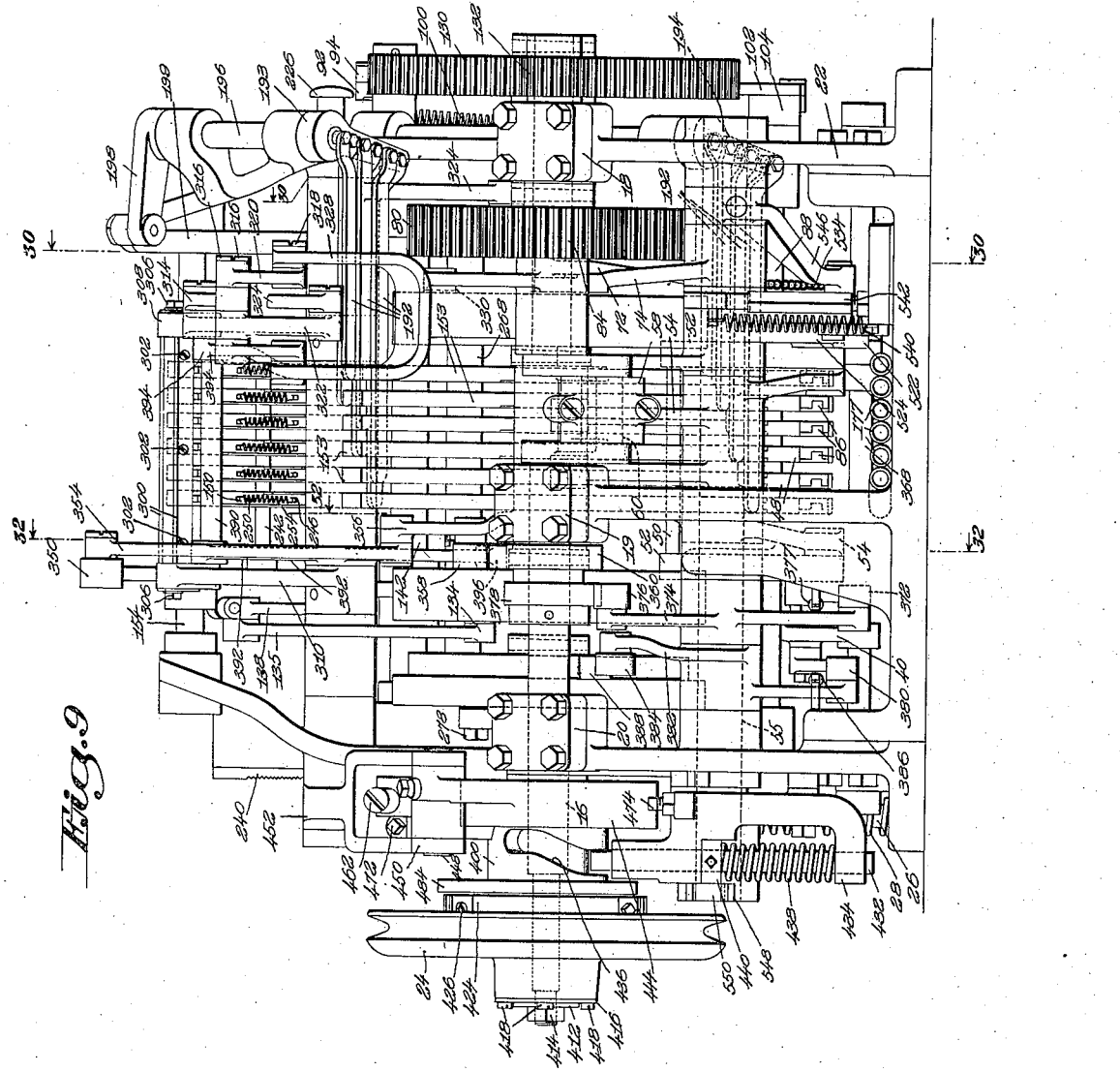

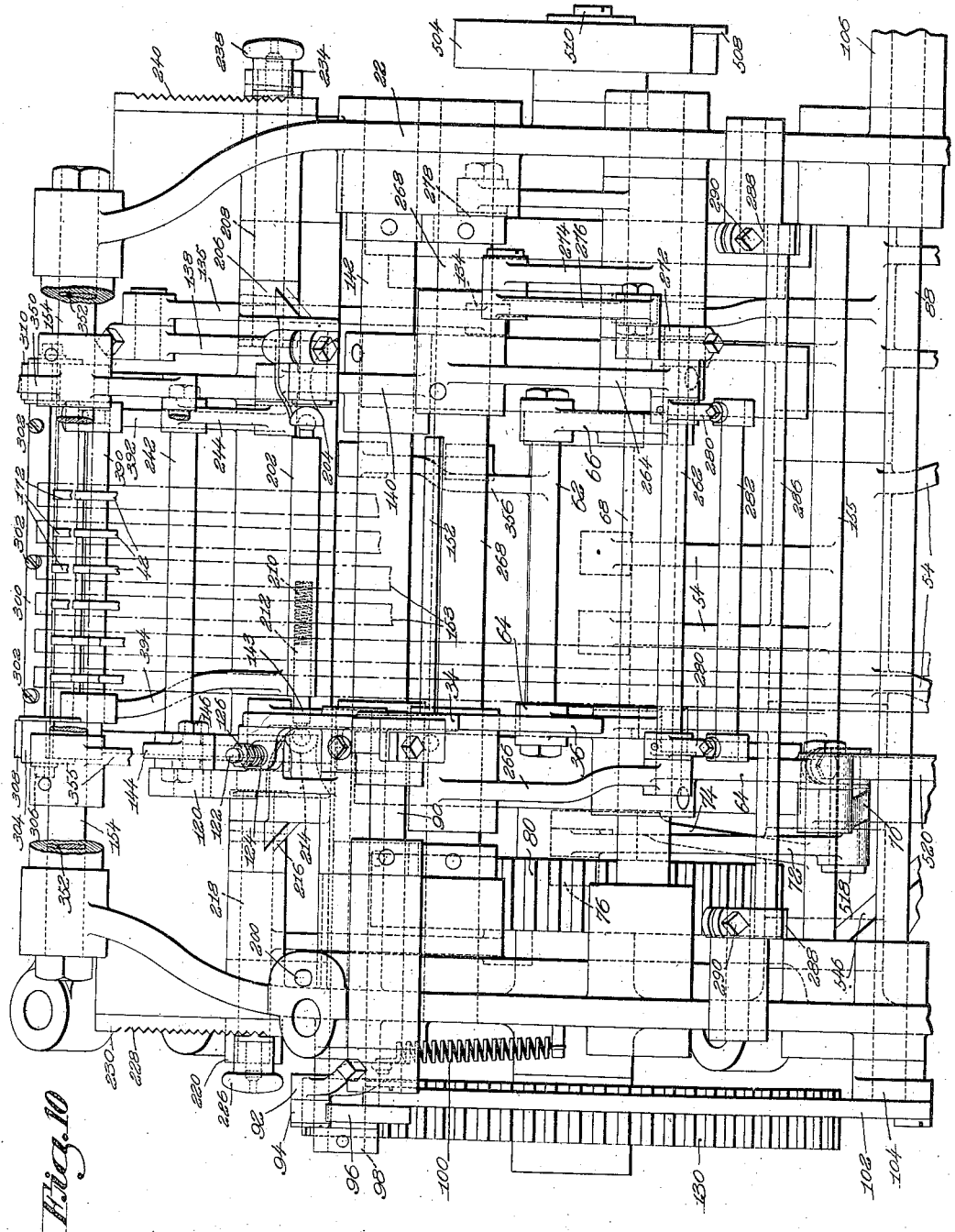

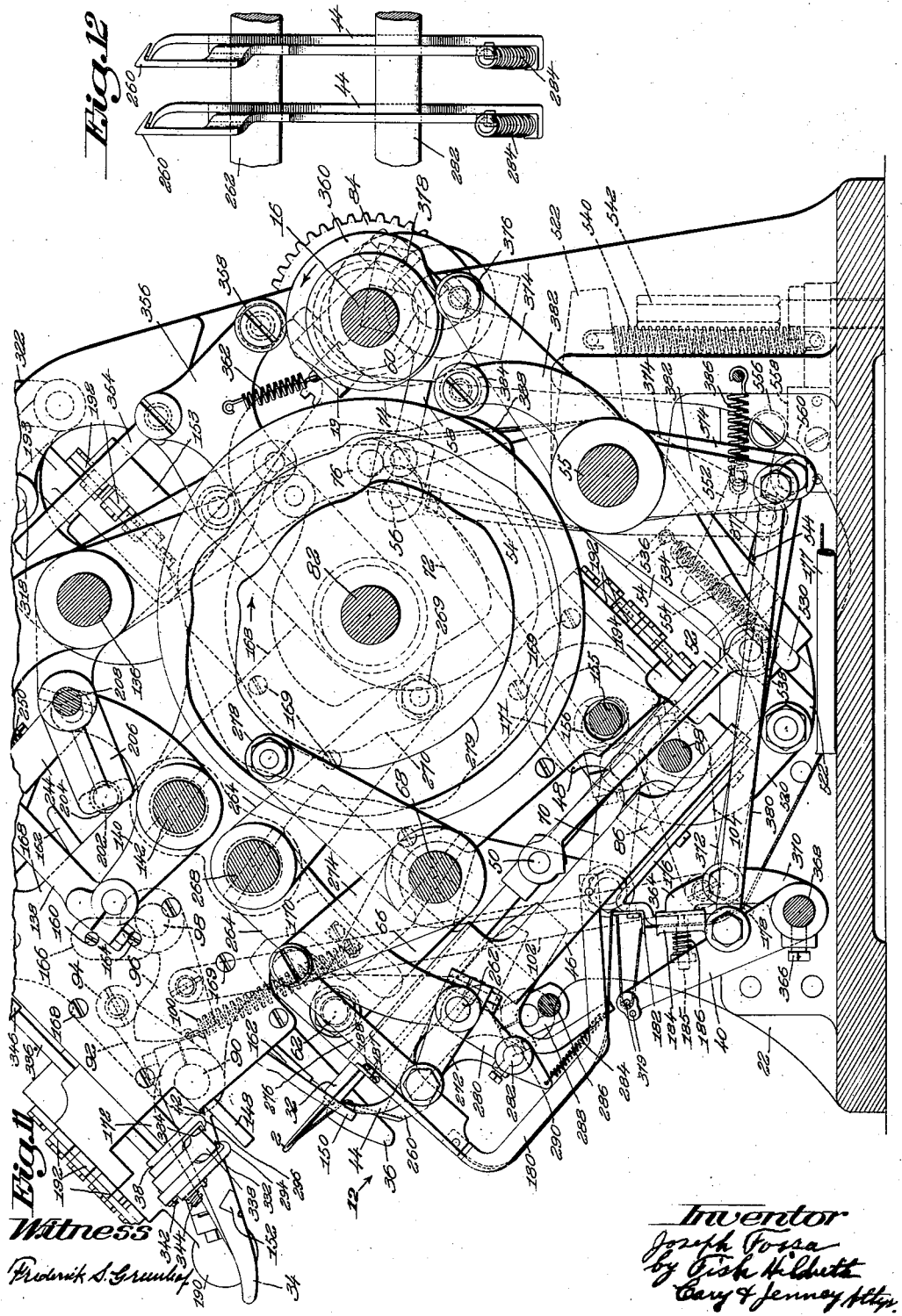

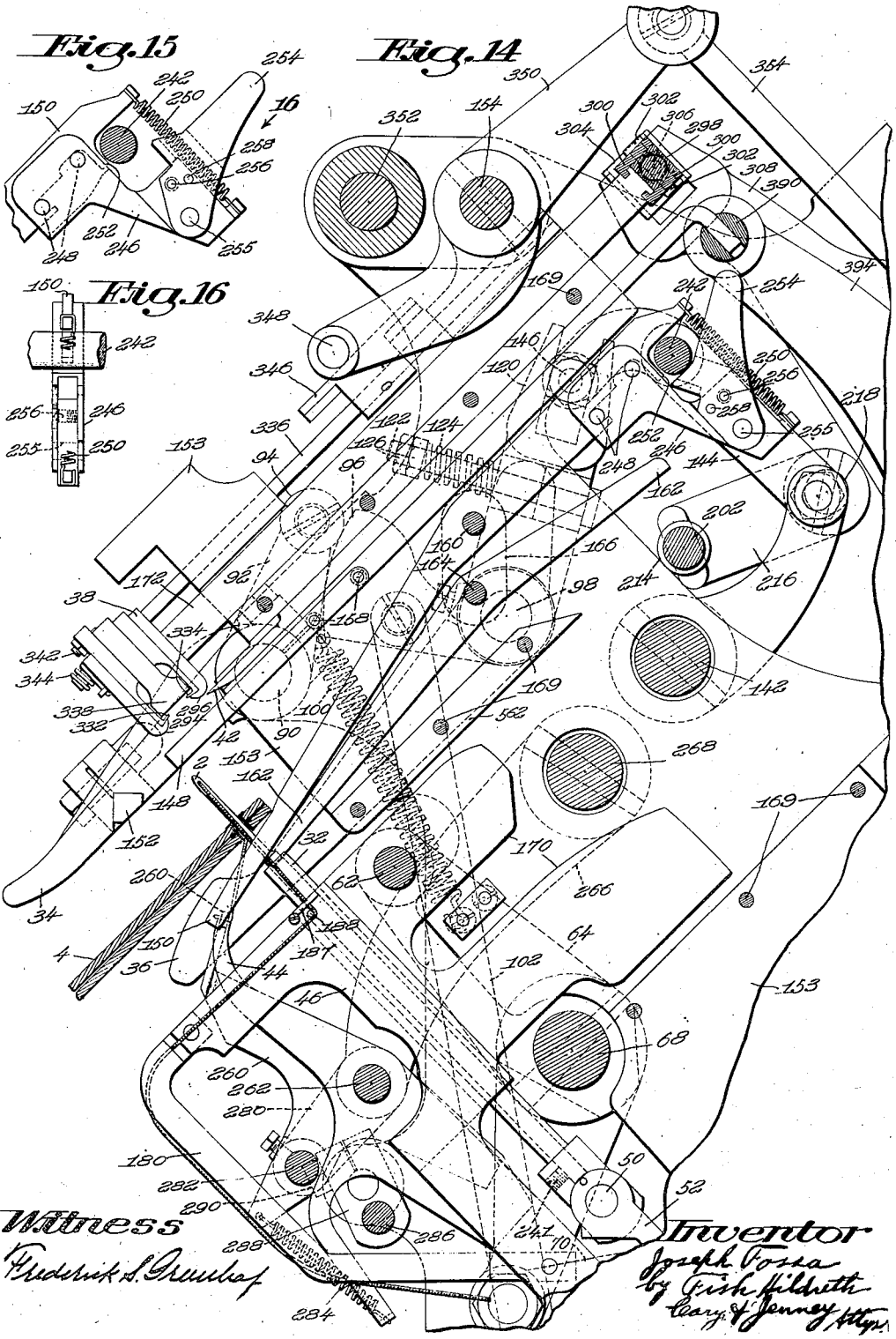

Jan. 25, 1938.  J. FOSSA  2,106,320
MACHINE FOR LACING SHOE UPPERS
Filed May 11, 1935  24 Sheets-Sheet 9
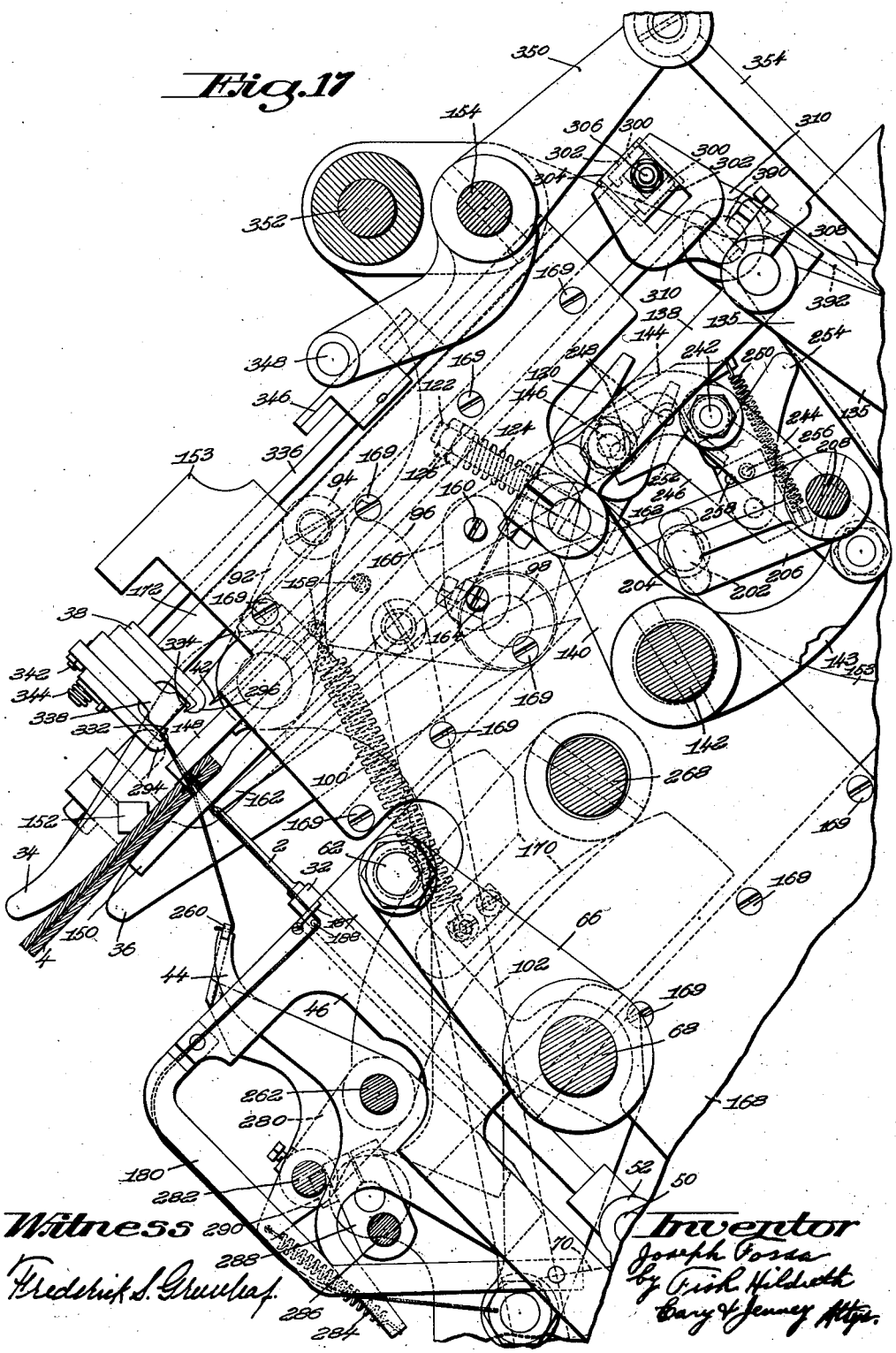

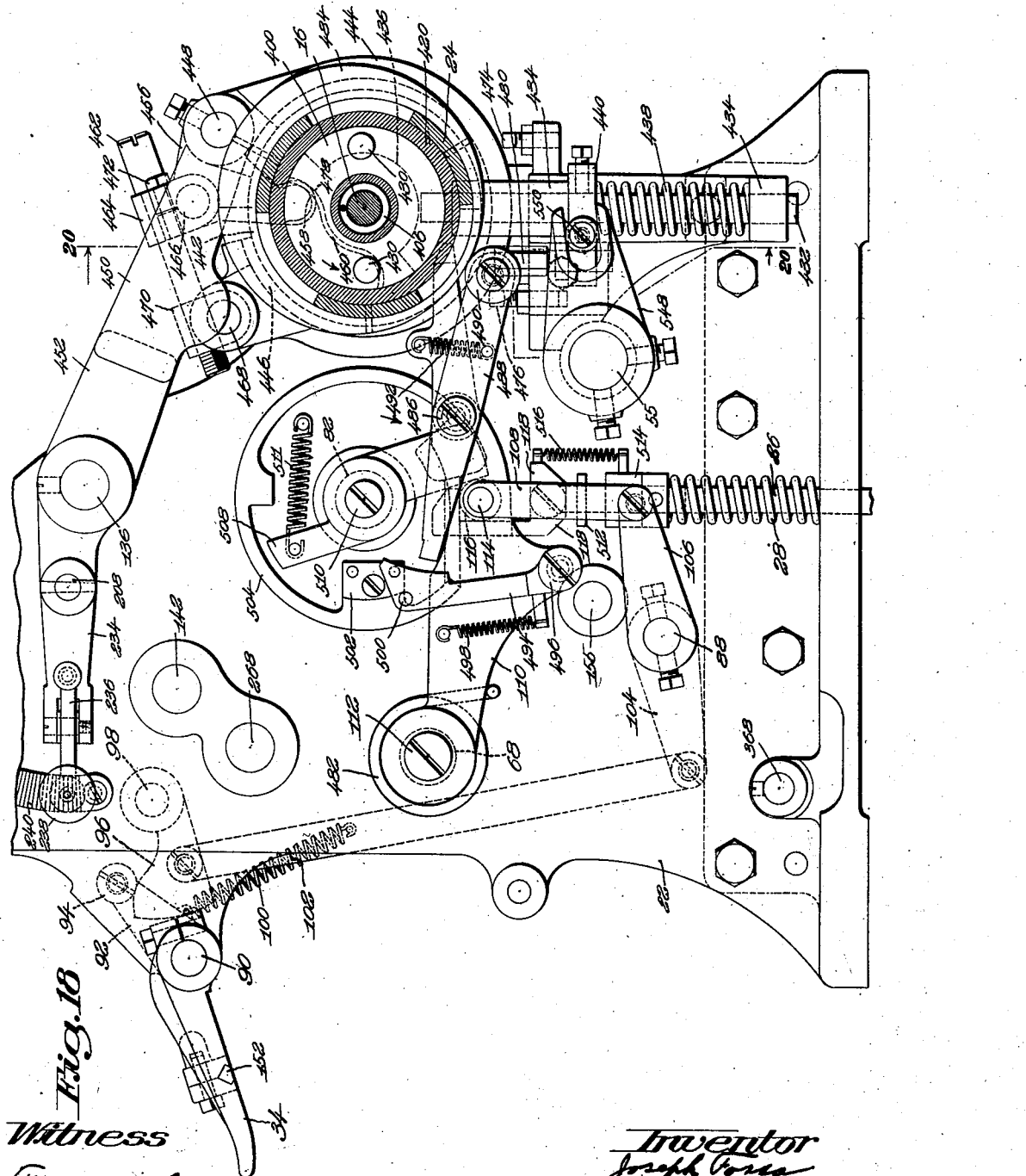

Jan. 25, 1938. J. FOSSA 2,106,320
MACHINE FOR LACING SHOE UPPERS
Filed May 11, 1935 24 Sheets-Sheet 11
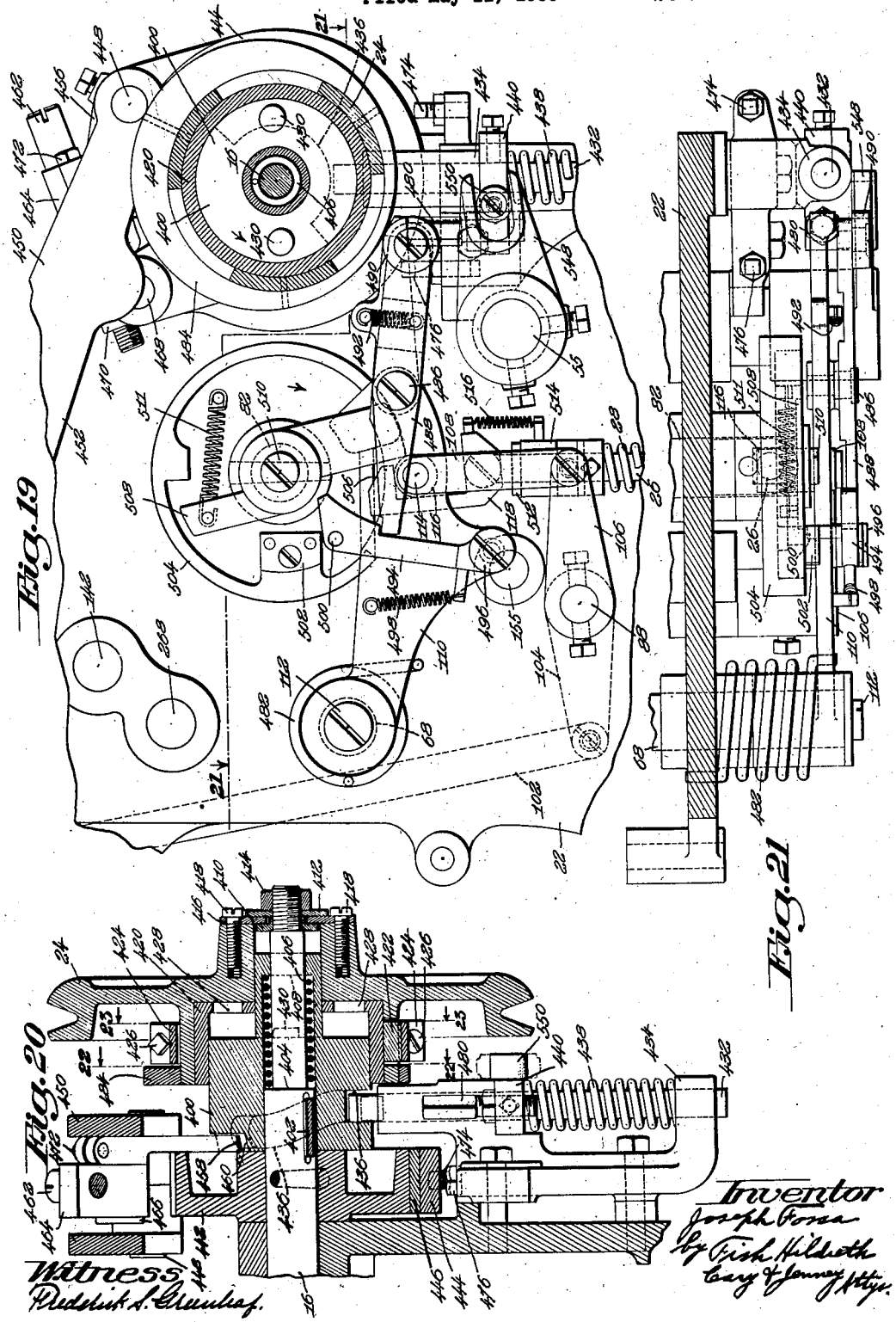

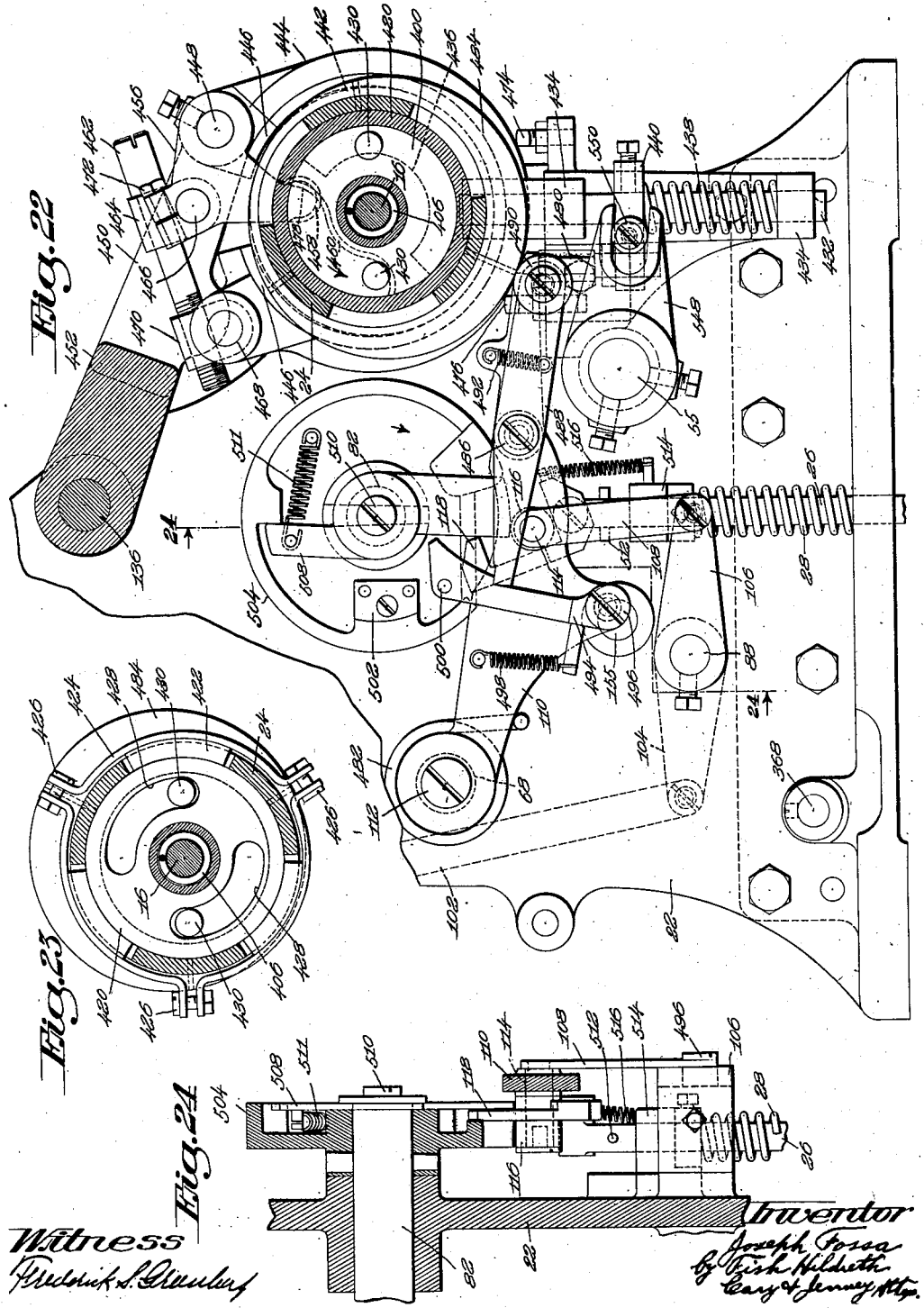

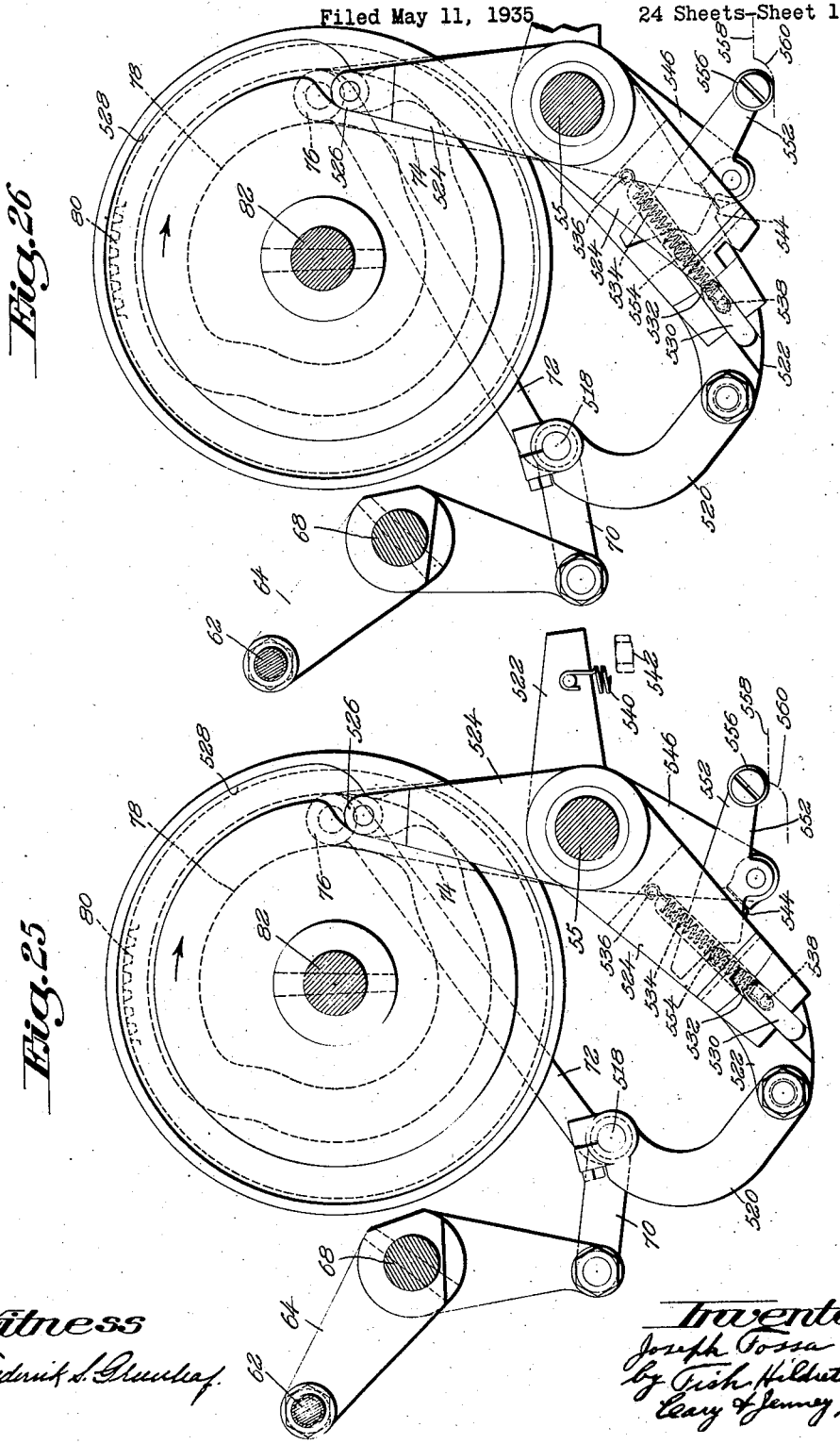

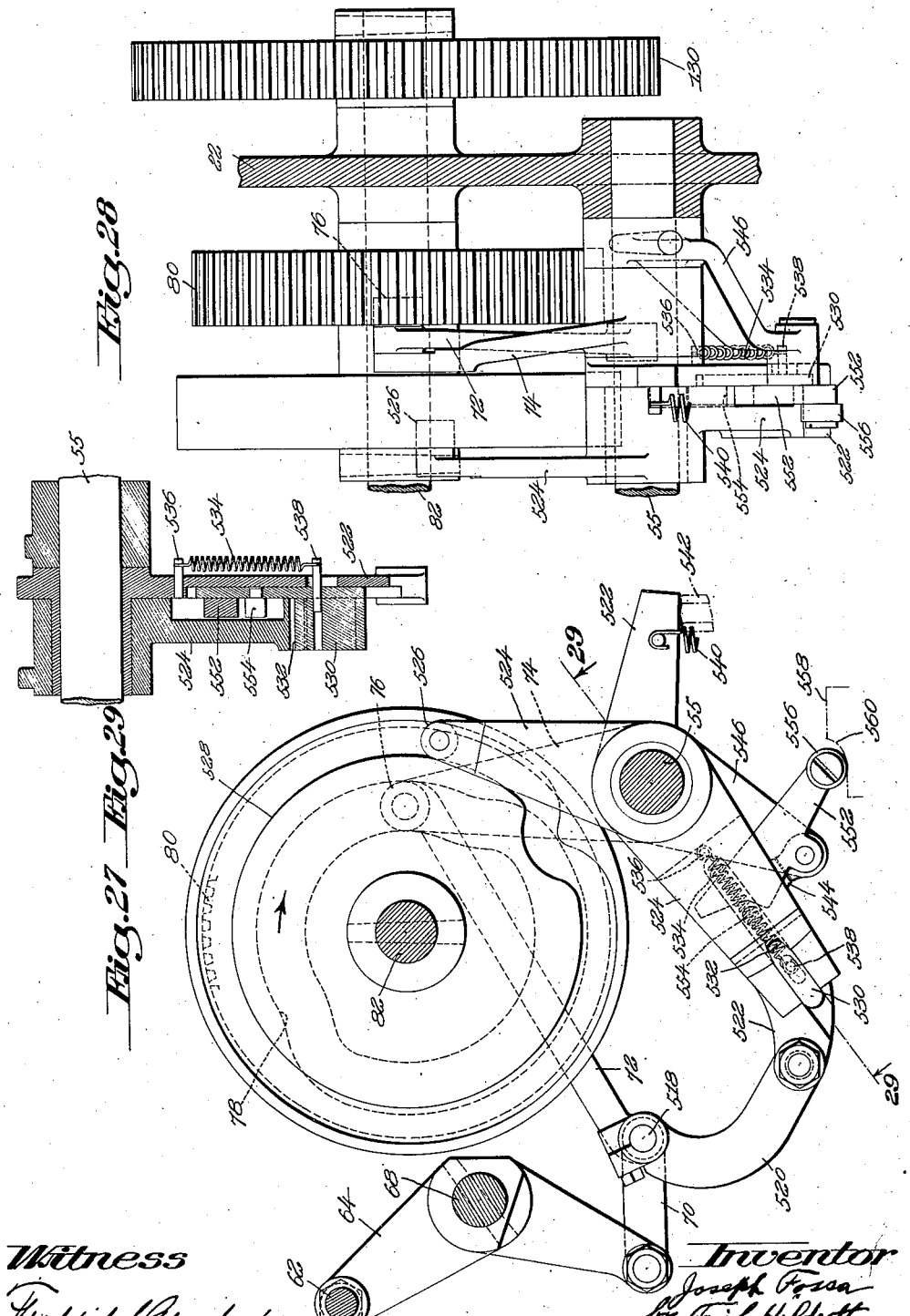

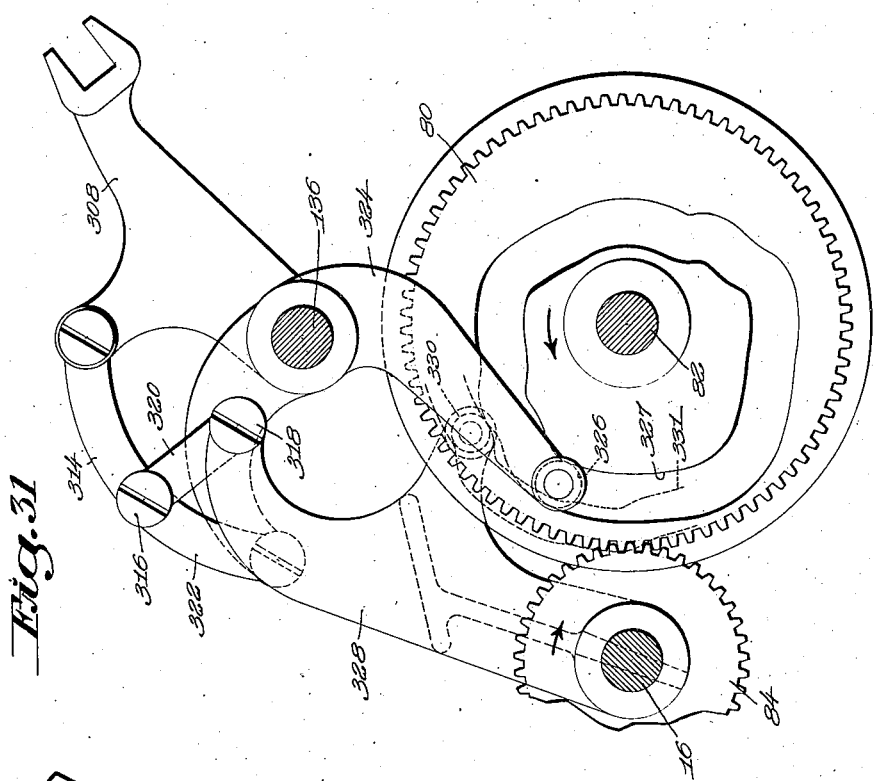
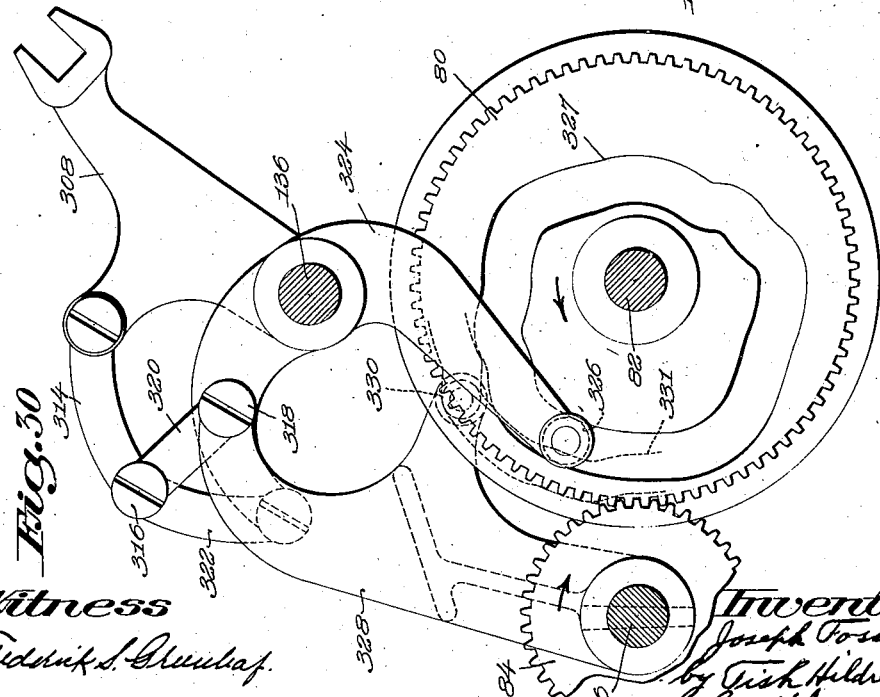

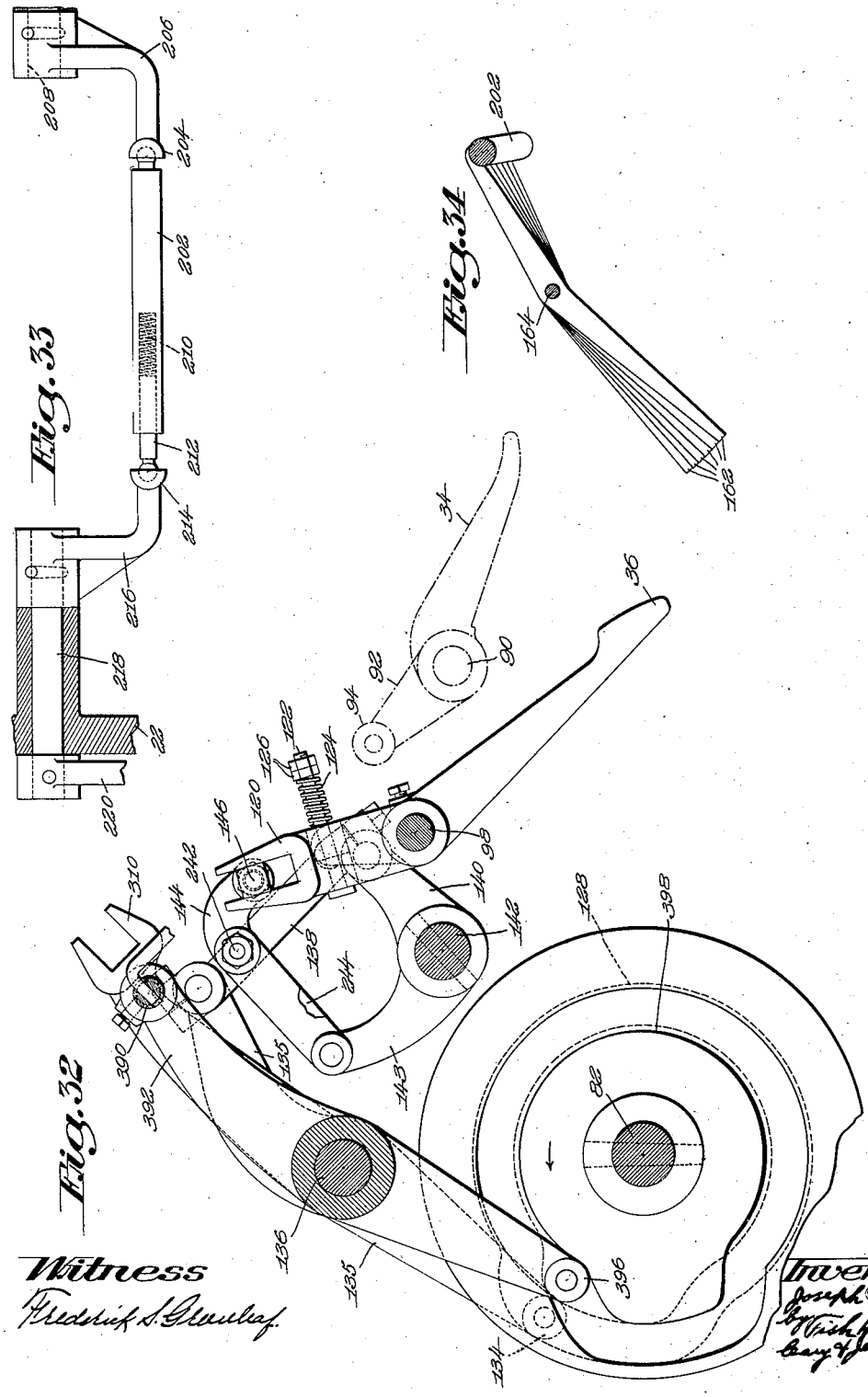

Jan. 25, 1938.  J. FOSSA  2,106,320
MACHINE FOR LACING SHOE UPPERS
Filed May 11, 1935  24 Sheets-Sheet 17
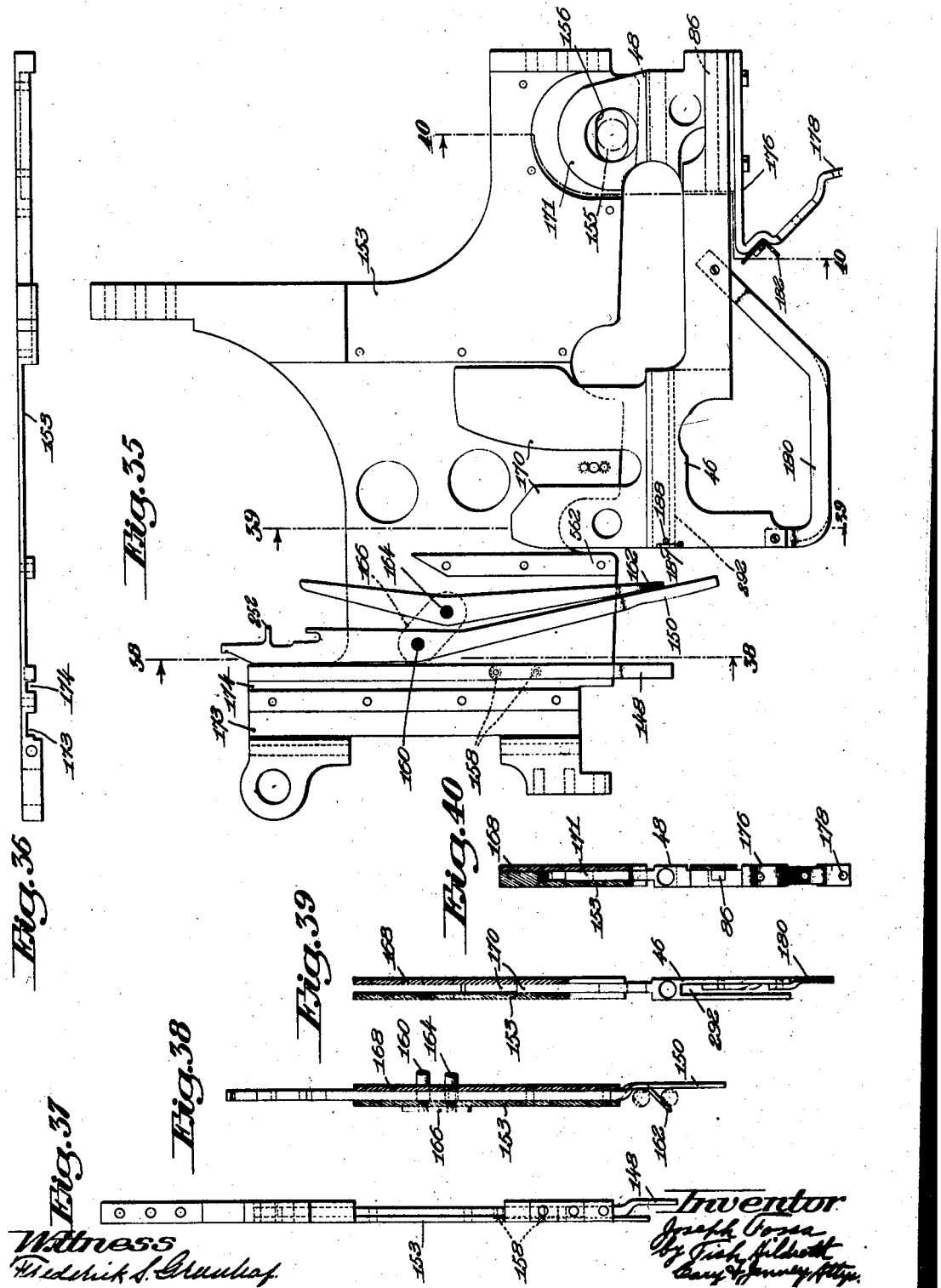

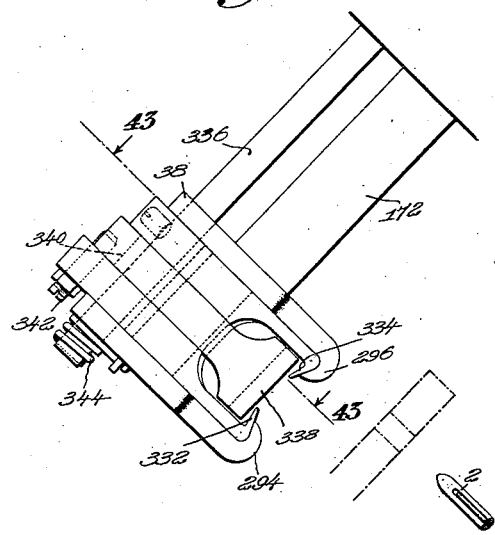
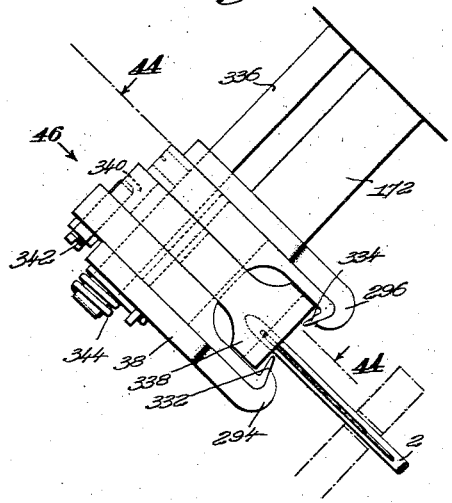
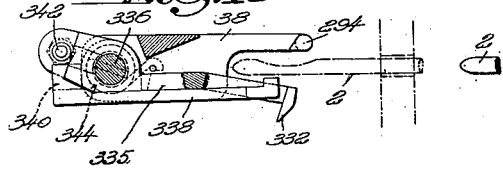
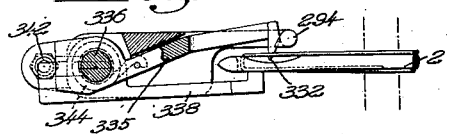
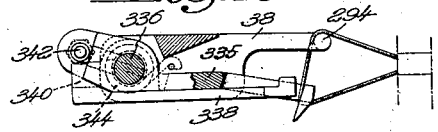
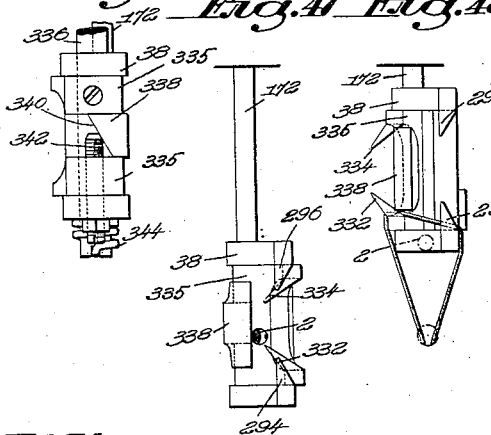
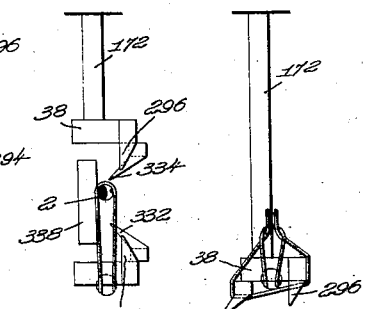

Jan. 25, 1938.  J. FOSSA  2,106,320
MACHINE FOR LACING SHOE UPPERS
Filed May 11, 1935   24 Sheets-Sheet 19
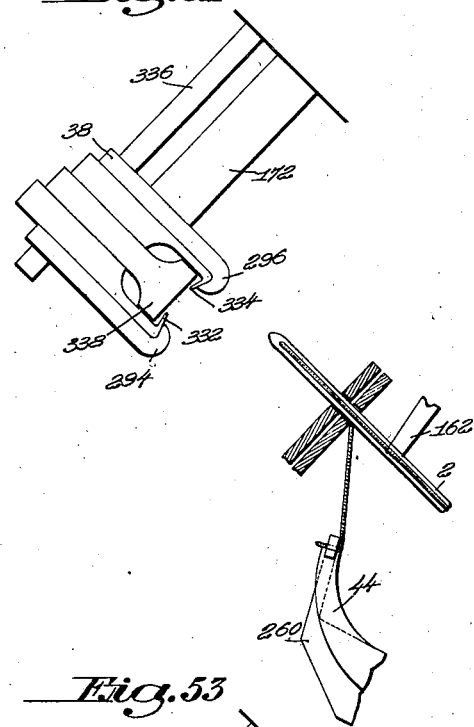
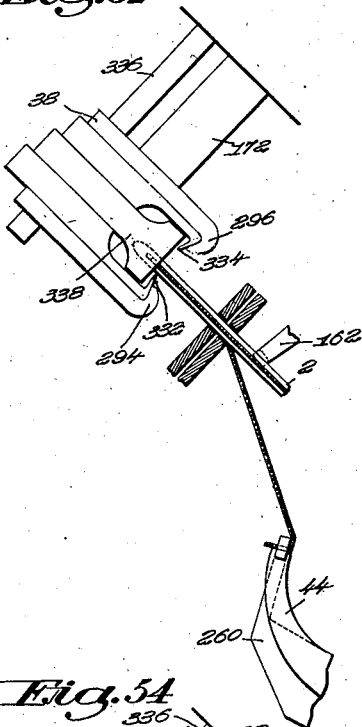
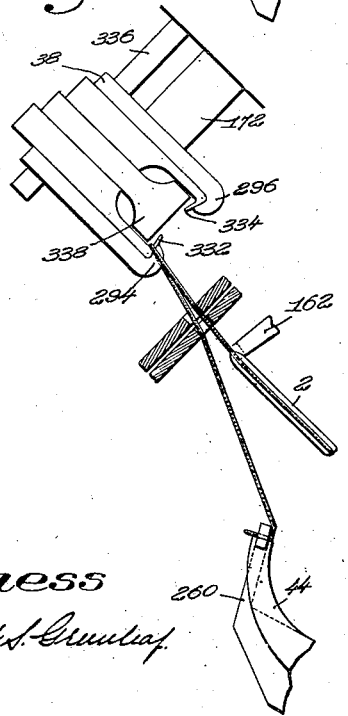
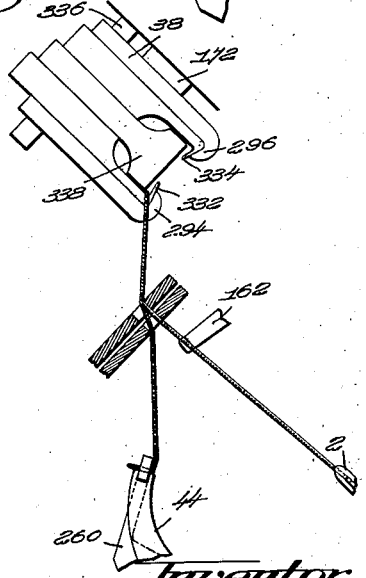

Jan. 25, 1938.   J. FOSSA   2,106,320
MACHINE FOR LACING SHOE UPPERS
Filed May 11, 1935   24 Sheets-Sheet 20

Witness
Frederick S. Greenleaf.

Inventor
Joseph Fossa
by Fish Hildreth
Cary & Jenney Atty

Jan. 25, 1938. J. FOSSA 2,106,320
MACHINE FOR LACING SHOE UPPERS
Filed May 11, 1935 24 Sheets-Sheet 22
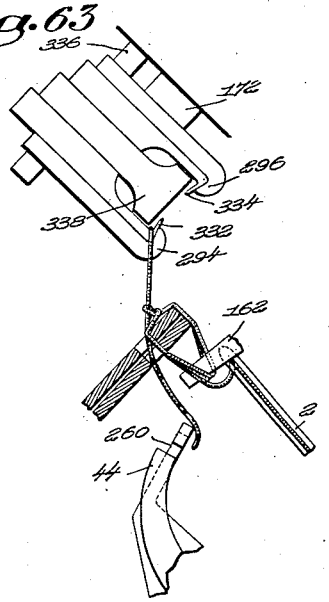
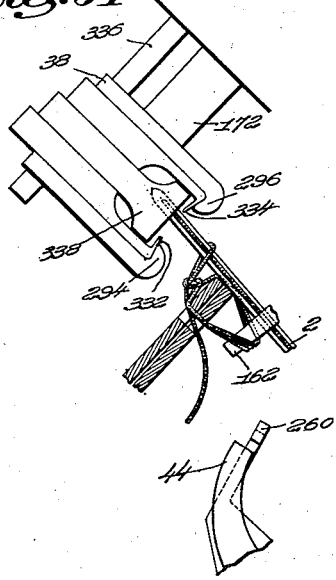
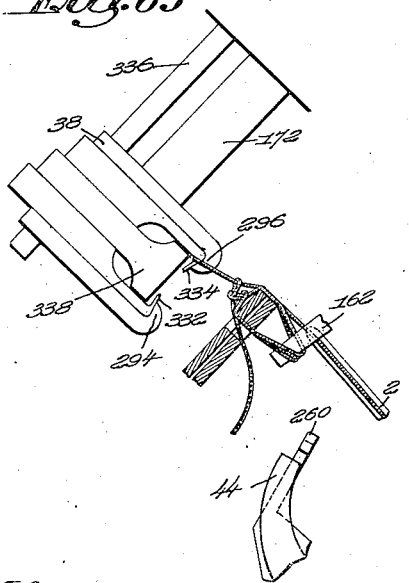
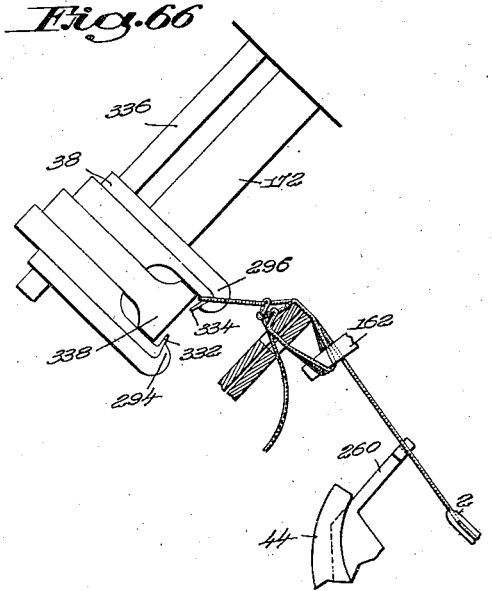

Jan. 25, 1938.  J. FOSSA  2,106,320
MACHINE FOR LACING SHOE UPPERS
Filed May 11, 1935   24 Sheets-Sheet 23
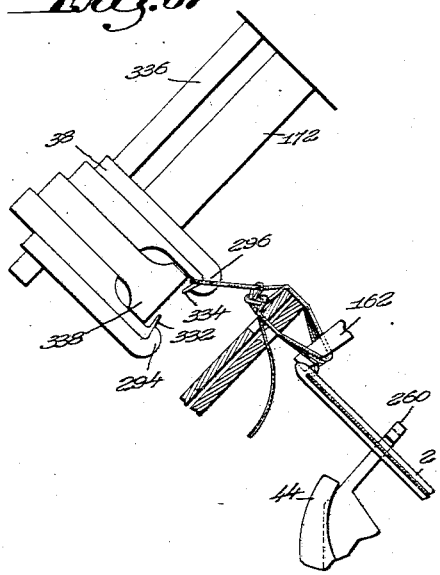
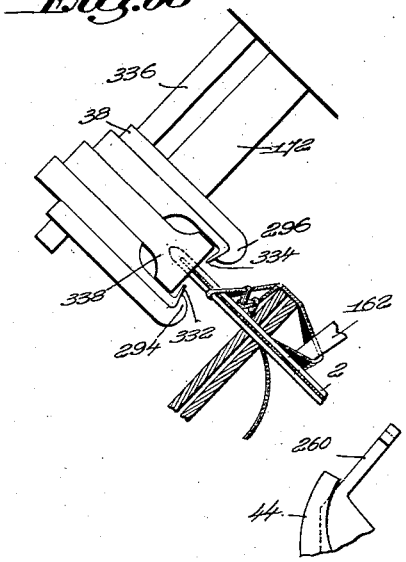
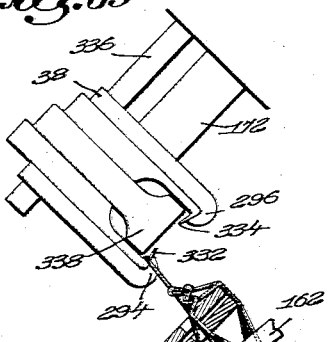
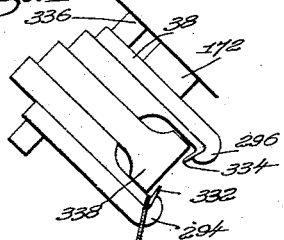
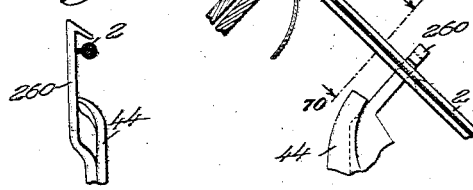
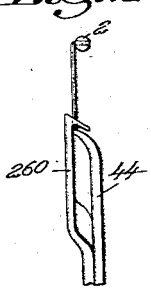
Witness
Frederick S. Greenleaf
Inventor
Joseph Fossa
by Fish Hildreth
Cary & Jenney Attys.

Jan. 25, 1938. J. FOSSA 2,106,320
MACHINE FOR LACING SHOE UPPERS
Filed May 11, 1935 24 Sheets-Sheet 24
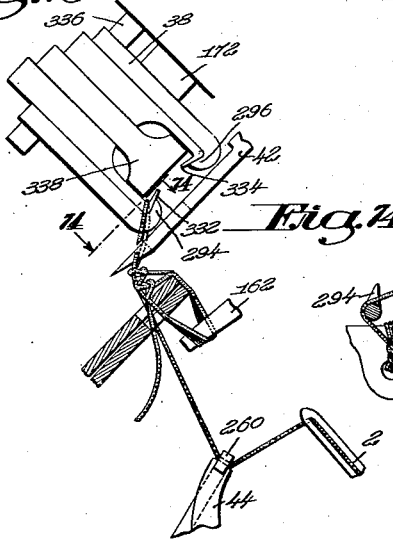
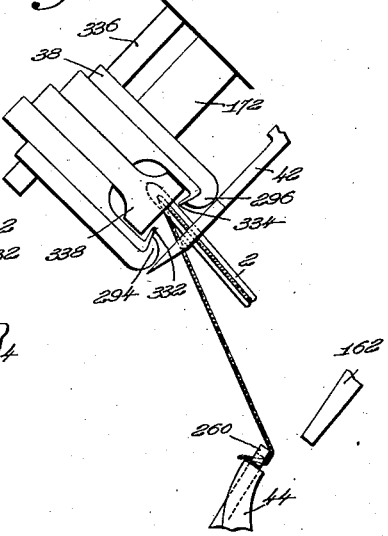
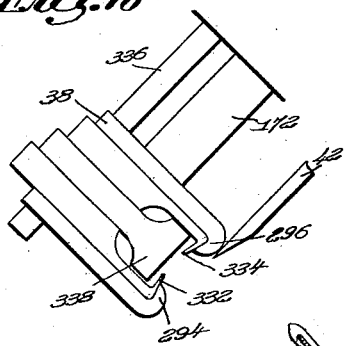
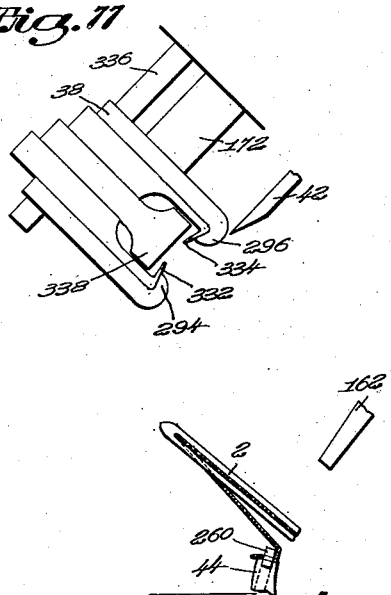

Patented Jan. 25, 1938

2,106,320

UNITED STATES PATENT OFFICE 2,106,320

MACHINE FOR LACING SHOE UPPERS

Joseph Fossa, Salem, Mass., assignor to United Shoe Machinery Corporation, Paterson, N. J., a corporation of New Jersey Application May 11, 1935, Serial No. 21,011

35 Claims. (Cl. 112—5)

The present invention relates to a method of, and machine for, lacing shoe uppers to prepare them for the lasting operation.

The principal object of the invention is to provide a method and means for forming individual cord lacings in the eyelet holes of a shoe upper in a new and improved manner, whereby individual cord lacings may be formed accurately and with certainty having a length as short or as long as desired and capable of withstanding any strains to which the upper may be subjected in being applied to the last.

Another object of the invention is to provide a shoe upper lacing machine, adapted to form individual cord lacings, having cord handling devices of simple design and arrangement, free from the complication of construction and uncertainty and inaccuracy of operation incident to the use of conventional forms of knot tying devices.

Other objects of the invention are to provide a method of, and means for, forming individual cord lacings which, while extending across the edges of the shoe upper, will not chafe or mark the surface of the upper during lasting or other shoe making operations.

Other objects of the invention are, in general, to improve the construction and mode of operation of the various parts of shoe upper lacing machines.

With the above objects in view, the present invention consists in the novel operations performed in lacing a shoe upper, and in the novel mechanical devices, combinations and arrangements of parts hereinafter described and claimed.

The several features of the present invention and the advantages to be obtained thereby will be readily understood by one skilled in the art from the following description taken in connection with the accompanying drawings in which Figure 1 is a view in left side elevation of a lacing machine embodying the mechanical features of the present invention and which may be used in carrying out the novel method of the present invention; Figure 2 is a perspective view of a shoe upper laced according to the present invention; Figure 3 is a view illustrating, on an enlarged scale, an individual lacing of the shoe upper shown in Figure 2; Figure 4 is a view in front elevation of the machine shown in Figure 1; Figure 5 is a view in side elevation looking from the right of the machine; Figure 6 is a detail view of one of the parts of the machine; Figure 7 is a detail view of another of the machine parts; Figure 8 is a detail view of another part of the machine; Figure 9 is a view in rear elevation of the machine shown in Figure 1; Figure 10 is a view in front elevation, on an enlarged scale, of the machine with certain parts removed and broken away; Figure 11 is an enlarged view, in section, taken along the line 11—11 of Figure 4 with the machine in stopped position; Figure 12 is a detail view on a further enlarged scale, looking in the direction of the arrow 12 in Figure 11; Figure 13 is a view in section of the machine taken along the line 13—13 of Figure 4, with the parts of the machine in positions assumed as the machine is about to start into operation; Figure 14 is a similar sectional view, on a still further enlarged scale, illustrating an upper in the machine; Figure 15 is a detail view of parts of the clamp actuating mechanism of the machine indicating the positions with a particular clamp rendered inoperative; Figure 16 is a detail view of the same parts looking in the direction of the arrow 16 in Figure 15; Figure 17 is a sectional view taken on substantially the same line as that of Figure 14, indicating the positions of parts after the first reciprocation of the needles; Figure 18 is a view in elevation looking from the right, partly in section and partly broken away, showing certain parts of the driving and stopping mechanisms in stopped positions; Figure 19 is a similar view with the same parts in starting positions; Figure 20 is a sectional view taken along the line 20—20 of Figure 18; Figure 21 is a sectional view taken along the line 21—21 of Figure 19; Figure 22 is another sectional view taken along the line 22—22 of Figure 20, illustrating positions assumed by the parts subsequently to those shown in Figure 19; Figure 23 is a detail view of the clutch taken in section on line 23—23 of Figure 20; Figure 24 is a sectional view of the clutch taken along the line 24—24 of Figure 22; Figure 25 is a detail view of the needle carrier mechanism, illustrating the positions of the parts with the machine stopped; Figure 26 is a similar view illustrating the parts in starting; Figure 27 is a similar view illustrating the parts in positions assumed subsequent to those shown in Figure 26; Figure 28 is a view in rear elevation of the mechanism shown in Figure 27; Figure 29 is a view of the same mechanism taken along the line 29—29 of Figure 27; Figure 30 is a detail view of the looper actuating mechanism, as viewed along the line 30—30 of Figure 9, illustrating the parts with the machine stopped; Figure 31 is a similar view taken after the machine has started; Figure 32 is a detail view of the cutter and gripper actuating mechanisms taken along the line 32—32 of Figure 9, with the machine in stopped position; Figure 33 is a detail view of a portion of the cord measuring mechanism; Figure 34 is a detail view of the cord measuring fingers, illustrating the positions assumed when set for progressively increasing the spacing of the shoe upper sides; Figure 35 is a detail side view of one of the frame plates for the individual lacing units; Figure 36 is a plan view of the plate shown in Figure 35; Figure 37 is an edgewise view, taken at right angles to that of Figure 36, of the plate shown in Figure 35; Figure 38 is a sectional view of the frame plate together with its cover plate, taken along the line 38—38 of Figure 35; Figure 39 is a sectional view of the same parts, taken along the line 39—39 of Figure 35; Figure 40 is a sectional view of the same parts taken along the line 40—40 of Figure 35; Figure 41 is a detail view, on an enlarged scale, illustrating one of the loopers in its lowermost position just after starting the machine; Figure 42 is a similar view, taken just after the looper has been raised, to receive the needle loop during the first needle reciprocation; Figure 43 is a sectional view of the looper shown in Figure 41, taken along the line 43—43; Figure 44 is a sectional view of the looper shown in Figure 42, taken along the line 44—44; Figure 45 is a view similar to that shown in Figure 44, illustrating a needle loop spread by the looper; Figure 46 is a view of the looper looking in the direction of the arrow 46 in Figure 42; Figures 47 to 50, inclusive, are detail views illustrating parts of the loopers in successive positions; Figures 51 to 69, inclusive, are detail views illustrating successive positions of certain of the lacing devices; Figure 70 is a sectional view, taken along the line 70—70 of Figure 69; Figure 71 is a detail view illustrating the positions of the needle and looper subsequent to those shown in Figure 69; Figure 72 is a sectional view, taken along the line 72—72 of Figure 71; Figure 73 is a detail view of the needle and looper illustrating positions subsequent to those shown in Figure 71; Figure 74 is a sectional view, taken along the line 74—74 of Figure 73; Figure 75 is a detail view of the needle and looper in positions following those shown in Figure 73; Figure 76 is a detail view of the needle and looper in final operating position of the machine just before coming to rest; and Figure 77 is a detail view of the needle and looper with the machine at rest.

The lacing machine illustrated in the drawings is arranged with a row of parallel eye-pointed needles 2 on which, while stationary, oppositely disposed aligned eyelets in the quarter portions of a folded upper to be laced are impaled by the operator. When the machine is started, the upper is gripped in its folded condition and held in the machine until the lacing is completed. Thereafter the upper drops from the machine, and the machine is brought to rest. The completely laced upper, as shown in Figure 2 of the drawings, comprises a plurality of separately tied lengths of cord, each having the proper amount of slack to make the upper, indicated at 4, conform in a predetermined manner with the last (not shown). Preferably, the amount of slack in each individual lacing is made to progressively increase from the first eyelet 6 in the toe end of the upper to the last eyelet 8 at the ankle opening.

The nature of each individual lacing applied by the machine of the invention is more clearly illustrated in Figure 3. A length of cord is formed in a series of interconnected loops, alternate ones 10 of which are passed through pairs of aligned eyelets in opposite sides of the upper 4 and the others 12, of which are passed across the edges of the upper. The bight portion 14 of each loop, after being passed through the eyelets or across the upper edges, is drawn through the bight of the previously formed loop to lock the bight in place and the final loop is severed along the loop in place and the final loop is severed along the bight portion. The severed end remaining in the machine is then withdrawn from the next to the last bight, leaving the free end of the cord forming the lacing extending through said next to last bight to lock the corresponding loop in place.

In a lacing formed as shown, two complete loops forming four strands extending across the edges have been found sufficient to prevent chafing or marring of the upper. To secure the bights of the loops together, three loops passing through the eyelets with the final loop severed and the end withdrawn, are effective to fasten the loops crossing the edges.

The machine hereinafter described is operated by a main driven shaft 16 rotating in the direction of the arrow, Figure 1, in bearings 18, 19 and 20 (see Fig. 9) formed in the main frame 22 of the machine. To rotate the shaft 16, the right end of the shaft, viewing the machine from the front, carries a driving and stopping mechanism for connecting and disconnecting a main driving pulley 24 loose on the shaft. The pulley 24 is connected with the shaft by depressing a treadle connected rod 26 (Fig. 5) which controls a driving and stopping mechanism, hereinafter described. When the rod is released, a spring 28 coiled about the rod causes it to rise, bringing the main shaft to rest at the desired point.

Before applying an upper to the machine, it is folded, with eyelets at opposite sides in registration. The eyelets are then applied to the needles which are mounted in a row of inclined needle bars 32 (see Fig. 11) with the ends of the needles projecting upwardly and at an angle of about 45 degrees to the horizontal. The uppers are first held loosely in folded relation by the needles, as shown in Figure 14, until the machine is started. In starting the machine, a pair of pivotally mounted clamp jaws 34 and 36 act against opposite sides of the upper to secure the upper in proper folded relation (Fig. 17) and remain in this position until the lacing operation is completed.

A separate lacing cord is supplied to each needle and, when the machine is at rest ready to receive the folded upper upon the needles, each lacing cord extends upwardly from the supply lengthwise of the needle through the eye of the needle, and then downwardly to a cord end gripper, as indicated in Figure 11. When, therefore, the upper is placed in position on the needles, a cord loop extends through each pair of aligned eyelets, as indicated in Figure 14. Upon starting the machine, each needle is advanced upwardly to bring the loop on the needle into position to be engaged by a cooperating looper or loop taker and thereafter the needles are withdrawn and are given a number of up-and-down reciprocations, the reciprocations taking place alternately across the edges of the upper and through the aligned eyelets. During each upward movement of a needle, the cooperating loop taker retains the preceding loop in the path of the needle and then casts off this loop and engages the loop on the needle and retains it during the downward stroke of the needle. Each needle loop is thus passed through the preceding loop. The loop takers, of which there is one for each needle, are indicated at 38. Also cooperating with the needles in forming the lacings is a take-up 40 common to all the needles, a cutter knife 42 associated with each needle for severing at its bight portion the last formed needle loop, and the cord end gripper, previously mentioned, associated with each needle, one of the members of which is indicated at 44.

The needle bars 32 (see Figs. 11, 13 and 35) are mounted to slide in guideways engaging the upper and lower ends of the bars, and formed respectively in carriers 46 and blocks 48. The central part of each needle bar is enlarged and perforated to fit a rod 50 running across the row of bars and being secured at either end to the upper ends of a pair of inclined links 52 pivotally connected at their lower ends with a pair of arms extending downwardly from the hub of a lever 54. The lever 54 is fulcrumed on a horizontal shaft 55 and an upwardly extending arm of the lever carries a pivot pin 56 on which is mounted one end of a pitman rod 58 connected with a crank portion 60 of the main shaft 16. The needles are reciprocated once by these connections for each complete rotation of the main shaft 16.

To cause the needles alternately to enter the eyelets and to pass across the edges of the upper with a jogging motion, the carriers 46 in which the bars 32 reciprocate are loosely supported at their upper ends on a horizontal rod 62 fixed at its left end to the upper arm of a lever 64, and at its right end to an arm 66, both of which are secured on a shaft 68 rotatable in the machine frame. The lower arm of lever 64 at the left (see Figs. 10, 11, 13 and 25 to 28) is connected by means of links 70 and 72, with an arm 74 rotatable loosely on the shaft 55. To actuate the arm 74 there is provided at its upper end a cam roll 76 engaging a cam slot 78 formed in one side of a spur gear 80 which makes three complete revolutions during each complete cycle of operations of the machine in lacing a shoe upper.

The gear 80 (see Figs. 1 and 9) rotates loosely on a cam shaft 82, once for every three revolutions of the main shaft 16 and meshes with a smaller gear 84 fast to the main shaft. The lower ends of the carriers 46 are connected through tongue and groove connections 86 (see Figs. 35 and 40) to the blocks 48, which in turn are fulcrumed loosely on a horizontal shaft 88 to permit the blocks to rock as the carriers are moved. The slight motion of the carriers in the direction of needle reciprocation relatively to the block 48 is taken up in the connections 86 between the block and the lower ends of the carriers.

The upper clamp jaw 34 is secured at the right end to a horizontal shaft 90 (see Fig. 1) and is moved to a fixed position before the machine is started through connections to the treadle rod 26. These connections comprise an arm 92 on the left end of the shaft 90, carrying a roll 94 arranged to be engaged by segmental cam 96 rotatable loosely on a horizontal shaft 98. The outer surface of the cam 96 is concentric with the shaft 98 and is terminated at its upper portion by an abrupt radial drop so that, when the cam is rotated beyond a certain point, the clamp jaw 34 may be raised immediately by the action of a tension spring 100 connected between the arm 92 and the machine frame. Movement of the cam in the other direction acts quickly to bring the clamp jaw into clamping position, and any further movement does not change the position of the clamp jaw. To oscillate the clamp cam 96, it is connected by a downwardly extending link 102 with an arm 104 made fast to the left end of the shaft 88 which passes loosely through the lower part of the machine frame. To the other end of the shaft 88 is secured an arm 106 (see Figs. 5 and 18) connected by means of a link 108 with a carrier arm 110 forming part of the driving and stopping mechanism hereinafter described, fulcrumed on the end of shaft 68 and held in place by a screw 112. Between the link 108 and the arm 110 there is a pivot 114 carrying a roll 116 engaged by a hook member 118 pivoted to the upper end of the treadle rod 26. When the treadle rod is depressed, the connections thus described cause the cam 96 to be raised and the clamp jaw 34 lowered to clamping position, in which position it is held during the operation of the machine.

Immediately when starting the machine the lower clamp jaw 36 is moved yieldingly against the upper held by the upper clamp jaw 34. The lower clamp jaw is secured to the shaft 98 on which the cam 96 is mounted. On the shaft 98 is also loosely mounted an arm 120 (see Figs. 10, 14, 17 and 32) forked at its free end and provided between its ends with a laterally projecting lug carrying a stud 122. The stud 122 passes loosely through a lug projecting laterally from the clamp jaw 36 and is surrounded by a compression spring 124 interposed between the projection on the clamp jaw and nuts 126 threaded on the end of the stud. When the arm 120 is rocked about the shaft 98, the clamp jaw 36 is forced yieldingly towards the jaw 34 by the spring 124. The clamp jaw is lowered by engagement of the projecting lugs on the jaw and arm.

The arm 120 is moved rearwardly of the machine to raise the clamp jaw 36 by connections actuated by a cam slot 128 in a cam secured to the cam shaft 82 which is rotated from the main drive shaft 16 through a gear 130 secured to the shaft 82 (see Figs. 1, 4 and 32) and a spur gear 132 fixed to the drive shaft 16, the ratio of the gears being such that the cam shaft rotates once for six revolutions of the shaft 16. The connections actuated by the cam slot 128 comprise a cam follower 134 mounted on one arm of a lever 135 fulcrumed on the right end of a horizontal shaft 136. The other arm of the lever 135 is connected by means of a link 138 with a forwardly extending arm 140 secured to the right end of a horizontal shaft 142, rotatably mounted in the machine frame. At the left end of shaft 142 there is secured a rearwardly extending arm 143 pivotally connected with an L-shaped link 144, the forward end of which loosely supports a squareheaded bolt 146 arranged to slide between the forked ends of the arm 120. The cam slot 128 is so formed that the clamp jaw 36 is moved upwardly to clamping position as soon as the machine is started, and is moved downwardly to release the upper after the lacing is completed before the main operating shaft 16 is brought to rest.

To support the individual eyelets of the upper so that the needles may reenter with certainty, the machine is provided with a series of clamping members 148 and 150, arranged to grip the upper in close proximity to the eyelets operated upon. To insure that the upper may be held flat, the upper clamp jaw 34 is provided with a laterally projecting rod 152 (see Figs. 4, 10 and 17) extending across the upper beside the row of eyelets. The lower clamping members 150 are of sufficient length to cooperate with the rod 152 in holding the upper in place throughout the row of eyelets, but the upper clamping members 148 are considerably shorter than the lower clamping members so as not to interfere with the rod. There is a pair of upper and lower clamping members 148 and 150 for each eyelet operated upon, and the lower clamping members engage the shoe upper between adjacent eyelets and closer to one of the eyelets than the other so as to provide maximum support for that eyelet.

To adapt the machine for effective operation on shoes having their eyelets differently spaced, the needles and many of the devices cooperating with the needles to form the lacing, including the individual clamping members 148 and 150, are carried by separate frames which are movably mounted in the machine so as to be adjustable to space the needles in accordance with the spacing of the eyelets in the upper to be operated upon. Each frame comprises a plate 153 (see Figs. 13, 14 and 35 to 40) slidably mounted at its upper end on a shaft 154 extending from left to right in the frame of the machine, and at its lower end on a rod 155 in the machine frame. The rod 155 passes through an elongated opening 156 in each individual plate, so that the lower portion of the plate is merely supported against movement transversely of the length of the plate.

Each upper clamping member 148 is rigidly fixed to a plate 153 by means of screws 158 and each lower clamping member 150 is in the form of a lever fulcrumed on a rod 160 passing loosely through the series of movable frames and being of sufficient length to engage all of the frames in their positions of greatest separation. In parallel relation with the lower clamping members 150 are a series of cord measuring fingers or levers 162 hereinafter more fully described, fulcrumed on a rod 164 extending loosely through the series of frames just beneath and in a manner similar to the rod 160. The rods 160 and 164 are made fast at their left ends by means of reduced threaded portions engaging a threaded plate 166 at the left side of the first supporting frame. The shoulders at the end of the reduced threaded portions on the rods engage the plate 153 of the first frame to clamp the plate 166 in place, the other end of the rods being supported by the plates.

The plate 153 of each frame is provided with raised and grooved portions and carries an enclosing cover plate 168 which prevents displacement of the clamping members 150 as well as the other devices mounted between on the plates. Each cover plate 168 is made fast to each frame plate 153 by screws 169 and is held in proper spaced relation by raised portions of plates 153. Between each main plate 153 and cover plate 168 project portions 170 of the needle carrier 46 in order that the carrier may be located in proper alignment to the other operating devices. A portion 171 of each block 48 also extends within the space between the main and cover plates to cause the lower ends of the needle carrier to assume parallel positions. A looper 38 is supported on each frame by the forward end of a rectangular rearwardly extending rod 172 (see Figs. 13, 14 and 17) slidably mounted in a slot 173 (Fig. 36) between the plates 153 and 168. The cutters 42 are also slidably mounted between plates in similar slots 174.

To deliver the cord to the needles supported in the carriers 46, on the outer surface of each block 48 is fastened a cord guide 176, the cord passing from a tube 177 through an opening 178 in the guide, about the take-up 40, and upwardly along a grooved portion of a cord guiding member 180 secured to each carrier 46. Each guide 176 also carries an L-shaped plate 182 having eyes formed in its flange portions through which the cord passes, towards and from the take-up 40. To provide control of the cord as it passes the guide 176, a flanged tension plate 184 is loosely mounted on a stud 185 carried by the guide member with the flanges extending along the sides of the guide member, and forced against the guide 176 by a spring 186 around the stud. On the needle carrier 46 there is also mounted a leaf spring tension 187 and a pin 188 about which the cord passes to the eye of the needle.

The individual supporting frames for the lacing devices are so connected that they are spaced equal distances apart at all times. The connections for changing the positions of the frames comprise a spacing lever 190 fixed to the upper end of a forwardly inclined shaft 191 (see Figs. 1, 4, 9 and 13). One arm of the lever 190 is formed with a forwardly projecting handle and is connected to the upper portion of each plate by a series of links 192 in such a way as to cause the plates to move proportionate distances when the arm is moved, the link from the first plate at the left being pivoted concentrically with the shaft 191 to hold that plate stationary. To cause the rearward and bottom portions of the plates 153 to maintain the same spacings, similar links connect these portions with arms 193 and 194 secured to the lower ends of the shaft 191 and of a parallel shaft 196, at the rear of the machine. The shaft 196 is rotated equally with the shaft 191 by an arm 198 at the upper end of shaft 196 and a link 199 connected between the arm 198 and a parallel arm of the lever 190. To hold the individual frames in adjusted position, the under surface of the lever 190 is engaged by a suitable spring-pressed plunger 200 (see Fig. 10) mounted in the machine frame.

To provide the requisite amount of slack in the individual cord lacings to permit the upper to be opened out for application to a last, the machine is provided with the series of cord measuring fingers 162 hereinbefore referred to which correspond in number to the needles. Each cord measuring finger lever is arranged to extend in close proximity to the under side of an upper in a position to be surrounded by a lacing as it is applied to the upper. The lower forward end of each measuring lever is bent at an angle to the edge of the upper to pass between the positions of a needle as it enters the eyelets, and as it crosses the upper edges respectively, as shown by the dash-dot positions in Figure 38. The angle between the end of the measuring lever and the edge of the upper is approximately 60 degrees so that, after the lacing operation is completed, the lacing surrounding the measuring end of the lever will slide easily from engagement therewith.

To locate each measuring finger lever 162 in proper position, the rearward ends of the levers are brought against a transverse rod 202 (see Figs. 10, 33 and 34) by the action of the cord in being drawn tightly through the eyelets. The rod 202 is formed with one spherical end engaging a socket 204 in an arm 206 fixed to a shaft 208 rotatable in the right side of the machine frame. The other end of the rod 202 is formed with an axial passage carrying a spring 210 and a plunger 212. The outer end of the plunger 212 is spherical in shape and engages a socket 214 in an arm 216 similar to the arm 206. The arm 216 is fixed to the inner end of a shaft 218 rotatable in the left side of the machine and operated by an adjusting arm 220. The free end of the arm 220 is arranged to be moved and held in any desired angular position so as to change the position of the rod 202 by a lever 222 (see Figs. 1 and 4) pivoted within a slot in the arm through which a fulcrum screw 224 passes. The outer end of the lever is provided with a handle 226 formed on its under surface with corrugations cooperating with corrugations 228 in an arcuate shaped plate 230 secured to the machine frame. The handle end of the lever 220 is held in engagement with the plate 228 by a compression spring 232 acting between the rearward end of the lever 222 and the arm 220 on which the lever is mounted. The outer end of the shaft 208 at the other side of the machine carries an arm 234 (see Figs. 4 and 5) provided with similar adjusting means, including a lever 236 on the arm having a handle 238, and a corrugated plate 240 to hold the arm 234 in the desired angular position. By means of the arms 220 and 234, the rod 202 against which the rearward ends of the cord measuring fingers 162 are forced may be moved not only to increase or decrease the length of all the lacings equally, but also to increase or decrease progressively the length of each lacing from one end of the series of eyelets operated upon to the other.

It is sometimes necessary to throw out of operation certain of the needles and lower individual clamping members 150 as, for example, where lacing hooks are provided in place of some of the eyelets in an upper as otherwise the clamping members or needles might strike against the hooks, so as to bend or otherwise injure them. For this purpose, the needles are removably secured in passages formed in the needle bars by set screws 241 (see Fig. 14) and the rearward end of each clamping member 150 is so connected to the clamp operating mechanism as to permit it to be rendered inoperative as desired.

To connect the lower individual clamping members 150 with the clamp operating mechanism, the L-shaped link 144 supports along its central portion one end of a horizontal rod 242, the other end of which is secured to the upper end of an arm 244 secured to the shaft 142 and extending parallel to the arm 143 (see Figs. 10 and 32). The link 244, the rod 242, and the lower portion of link 144 form an inverted U-shaped frame between the sides of which manually disconnectible means are provided for actuating the clamping members 150. The disconnectible means comprise angular plates 246, (see Figs. 14 to 17) each having a pair of pins 248 engaging cutaway portions of the rearward end of each lower clamping member 150. Between the end of each clamping member and the rearward end of each plate 246, there is stretched a coiled spring 250 for holding the plate against the clamping member, a projection 252 formed on the clamping member acting to prevent escape of the foremost pin 248 from the member. The rearward part of each plate 246 is surrounded by the lower slotted portion of a manually operated arm 254 (see Figs. 14, 15 and 16) having a shoulder arranged to slide beneath the rod 242, holding it close to the rearward end of the clamping member at all times. The arm 254 may be rotated clockwise, as shown in Fig. 15 about a pivot 255 in the plate to move the shoulder on the arm away from beneath the rod 242 so that, when the rod is moved downwardly in starting the machine, the particular lower individual clamping member 150 will not be raised. The spring 250 not only holds the plate 246 in place on the clamping member, but also permits the clamping member to yield when acting against the upper. To hold the arm 254 in either operative or inoperative positions, a spring-pressed plunger 256 is arranged in the plate 246 to be forced yieldingly into either of two openings 258 in the arm.

The cord end grippers are actuable towards and from the needles 2 and also towards and from an upper secured by the clamping members in a direction parallel to the reciprocating movement of the needles. Each gripper comprises a three-armed lever 44 having a suitably shaped forward gripping end, and a cooperating cord holding hook member 260 provided with an acute angular end (see Figs. 12, 70 and 72) so that, in moving rearwardly across the path of the needle, it may force the cord to one side and may draw the cord into the apex of the angular end during its return movement. When the cord is properly positioned in the holding member, the member 44 may secure the cord effectively by movement against it, as illustrated in Figure 12. In changing the spacings of the needles, the gripper members are slidable laterally along a horizontal carrier rod 262, the right end of which is rotatable in an arm of a lever 264 (see Fig. 10) and the left end of which is rotatable in an arm 266, both the lever 264 and arm 266 being secured to a transverse horizontal shaft 268 fulcrumed in the machine frame. To actuate the cord grippers towards and from the upper clamping members, the shaft 268 is rotated by a rearwardly and downwardly extending arm of the lever 264 having a cam roll 269 (see Fig. 11). The cam roll is operated by a cam slot 270 in a cam secured to the cam shaft 82.

To actuate the grippers towards and from the needles, an arm 272 is secured on the right end of the rod 262 and is connected to a bell crank lever 274 by a link 276. The bell crank lever 274 is also provided with a cam actuated roll 278 engaging a slot 279 in a cam on the shaft 82. Rocking movement of the rod 262 actuates a pair of arms 280 secured at the ends of the rod 262 and also to a horizontal rod 282 mounted between the forward ends of the arms 280. The rod 282 passes loosely through forwardly extending arms of the hook members 260 so that when the rod 262 is rocked, the hook members will also be rocked towards and from the needles. The gripper members 44 are caused to move with the hook members 260 by springs 284 stretched between the forward arms of the hook members and downwardly extending arms of the members 44. During the movement of the hook members towards the needles, rearwardly extending arms of the members 44 engage a horizontal rod 286 to cause the hook members to separate from the members 44 in order that the cord may pass into the hook portions of the hook members. The rod 286 is mounted at each end upon a link 288 releasably clamped by means of screws 290 to studs on the side frames of the machine. To insure that the gripper members will move laterally together along rods 262 and 286 with the needles and other lacing devices, the rearwardly extending arm of each gripper member 44 and a rearwardly extending arm of each hook member 260 is arranged side by side to slide in a slot 292 (see Fig. 39) formed in the needle bar carrier 46.

The loop takers 38 each comprise a main frame block integral with the rod 172. When the machine is at rest, the loop takers are in a retracted raised position, as indicated in Figures 5 and 11 to permit ready access to the needles in placing the folded upper in position in the machine. Upon starting the machine, the loop takers are moved downwardly and forwardly into a position to cooperate with the needles. To take the loops from the needles, retain the loops in the path of the needles during their next reciprocation, and then cast off these loops and engage the loops on the needles, the loop takers are reciprocated back and forth at right angles to the path of movement of the needles. The manner in which the needle loops are taken from the needles, retained until the next reciprocation of the needles and then cast off will be described hereinafter. The loop takers are moved into and out of operative position on starting and stopping the machine and are reciprocated while the machine is in operation to cooperate with the needles in forming the lacings by mechanism which reciprocates the rods 172 at the forward end of which the loop takers are mounted. The connections for reciprocating the rods 172 comprise a rectangular horizontal bar 298 (see Figs. 9 and 14) at the upper part of the machine to which are secured a pair of angle plates 300 having inturned flanges engaging opposite transverse grooves in the upper ends of rods 172. The angle plates 300 are secured to the bar 298 by screws 302 threaded into the bar, the connections between the ends of the loop taker rods 172 and the plates being such that the rods may slide freely as the lacing units are moved laterally to change the spacings of the needles. The ends of the bar 298 are supported in flanged blocks 304 by means of threaded studs 306 (see Fig. 17) passing loosely through the blocks and into the ends of the bar 298. The blocks 304 are mounted loosely with their flanges at the inner sides of the forked upper ends of a pair of arms 308 and 310 fixed to the shaft 136.

The arm 308 at the left side of the machine (see Figs. 9, 30 and 31) is connected by links 314 and 322 to a cam actuated lever 324 pivotally mounted upon the shaft 136 and provided with a follower 326 engaging a cam slot 327 in the gear 80. The gear 80 rotates three times during each complete cycle of operations of the machine and the shape of the cam slot 327 is such that the loop takers are maintained in the proper position with relation to the needles, as the needle carriers move back and forth transversely to the reciprocation of the needles, and impart the required reciprocating movements to the loop takers to cause them to cooperate with the needles in forming the lacings. To move the loop takers into and out of operative position upon starting and stopping the machine, the links 314 and 322 at their pivotal connections are also pivotally connected to one end of a link 320, the other end of which is connected at 318 to the upper end of a cam actuated lever 328, which lever is pivotally mounted upon the main shaft 16 and is provided intermediate its ends with a follower 330 engaging a cam slot 331 formed in a cam secured to the shaft 82. This shaft rotates once during each complete cycle of operations of the machine and the cam slot 331 is so shaped that as the machine is started the cam lever 328 is actuated to move the loop takers into operative position through the connections above described including the link 320, the links 314 and 322, and the arm 308, and as the machine is stopped, the loop takers are moved through the same connections to inoperative position.

In operating an ordinary eye-pointed needle sewing machine, it is the usual practice in engaging the needle loop with the looper to retract the needle slightly so as to open the loop between the work and the needle eye, thus facilitating the entrance of the looper. With a machine for operating on eyelets in shoe uppers, this cannot be done due to the lack of uniform frictional engagement between the cord and the eyelets. Also, slight variations may occur in spacings of eyelets in an upper and one or more of the needles may be deflected to one side when the eyelets are applied thereto so that they will not register properly with the loopers. To obviate these difficulties, means is provided, in the present machine, to insure that the loop takers will engage the loops of cord accurately at the proper sides of the needles.

To enable the loop takers to take the loops from the needles, retain the loops in the path of the needles during their next reciprocation and then cast off these loops and engage the newly presented loops on the needles, each loop taker is provided with two sets of points, one set of points being arranged to engage and spread a needle loop during the reciprocation of the loop taker in one direction and the other set of points being arranged to engage and spread a needle loop when the loop taker is reciprocated in the opposite direction. The points of one set are indicated at 294 and 332, and the points of the other set at 296 and 334 (see Figs. 41 to 50). The points are so arranged that when the needle associated with the loop taker rises to its highest position, the upper end of the needle will lie between and a little to one side of the path of reciprocation of the points. The loop on the needle is entered first by one of the fingers 332, 334, and in order to permit the points to enter the loop, the needle is cut away at one side for a short distance below the eye, as clearly shown in Fig. 44. In addition to taking the loops from the needles, the points 332 and 334 are also utilized in cooperation with the points 294 and 296 to spread the loop and hold it in the path of the needle during its next reciprocation. For convenience of description, therefore, the points 332, 334 will hereinafter be referred to as loop spreader points, and the points 294, 296 will be referred to as loop holder points. The loop holder points 294 and 296 are formed on arms extending downwardly from the main frame block of the loop taker and project towards each other in position to enter the needle loop as one side of the loop is forced outwardly away from the needle by the action of a loop spreader point. The loop spreader points 332, 334 extend slightly above and beyond the points 294, 296, and in order that they may cooperate with the points 294, 296 in spreading the needle loops, they are formed on a frame or carrier 335 secured to a rock shaft 336 which extends in parallel relation to the rod 172 and is mounted to rotate in the loop taker block 38 and to rotate and slide longitudinally in a frame plate 153. This rock shaft is acted upon by a spring 344 coiled around the shaft with one end engaging a slot in the end of the shaft, and with the other end engaging a pin on the loop taker block, the arrangement of the spring being such that it tends to turn the shaft in a counter-clockwise direction, as viewed in Figs. 43, 44 and 45, and hold the loop spreader fingers in the position indicated in Fig. 44. The rock shaft 336 is rotated in a clockwise direction to move the loop spreading fingers into the position indicated in Fig. 45 to spread the loop by mechanism hereinafter described.

In order to insure that the loop spreader points will properly engage the needle loops during the reciprocations of the loop taker blocks, each loop taker is provided with a point locating device which cooperates with the needle to determine accurately the position of the loop spreader points as they enter the needle loop. This point locating device consists of a plate 338 loosely mounted at its upper end on the shaft 336 within a slot at the upper portion of the block carrying the spreader points and at its lower end provided with a surface arranged to engage the needle when in its highest position. At its upper end the guide plate is formed with a bevelled face 340 (see Fig. 46) which is engaged by the end of a set screw 342 threaded through an upstanding lug on the block carrying the spreader points. During the movement of the rock shaft 336 in a counter-clockwise direction, under the force of the spring 344, the guide plate is moved yieldingly with the loop spreader point carrier 335 by the engagement of the set screw 342 with the bevel face 340. The movement of the plate is stopped by the engagement of the plate with the needle, as indicated in Figure 44, and while the plate is in engagement with the needle, it acts by reason of the engagement of the bevel face 340 with the set screw 342 to prevent further counter-clockwise movement of the carrier for the loop spreader points and locates the points in proper position with relation to the needle so that during the reciprocation of the loop takerblock, the points will enter with certainty into the needle loop. By adjusting the set screw 342, the loop spreader points may be positioned accurately in the desired position. On the return movement of the rock shaft 336 in a clockwise direction, which movement takes place after the needle has been retracted, the loop spreader points are moved to the position indicated in Fig. 45 to spread the loop, and during this movement, the carrier 335 for the points engages the plate 338 and moves it away from the path of the needle a short distance.

The loop taker points 294 and 332 engage a loop on the needle during the rearward reciprocating movement of the loop taker and the loop taker points 296 and 334 engage a needle loop during the forward reciprocating movement of the loop taker. During the forward reciprocation from the position illustrated in Figure 47 the loop is entered first by the finger 332 and then by the finger 294. During the continued rearward movement of the loop taker, the loop is carried rearwardly and after the needle is withdrawn the loop is spread by the transverse movement of the point 332 so that the loop extends over the holding point 294 and the spreader point 332 in position to be entered by the needle during its next upward stroke. During the return forward movement of the loop taker the loop on the fingers 332, 294 is engaged by the needle and cast off of the points, as indicated in Figure 49, and the new loop presented by the needle is engaged and spread by the points 296, 334, as indicated in Figure 50.

To actuate the loop spreader points away from the looper points in spreading each loop, a T-shaped arm 346 is mounted on the central part of each shaft 336 (see Figs. 1, 4, 14 and 17) extending upwardly and to the left. Above the arms 346 there is a rod 348 mounted at its right end in a downwardly extending arm of a lever 350 secured to the shaft 154 having bearings in upstanding lugs of the machine frame, and arranged parallel to a brace bar 352, connecting the sides of the machine frame. On the left end of the shaft 154 is mounted an arm 355 for supporting the corresponding end of rod 348. When the rod 348 is moved against the T-shaped arms 346 the loop spreaders are moved towards the right to positions indicated in Figs. 43 and 45. When the rod 348 is raised, the springs 344 cause a return movement of the loop spreaders to positions indicated in Fig. 44. The shaft 154 is rocked at suitable times by a link 354 (Figs. 5 and 9) pivotally connected with an upwardly extending arm of the lever 350, and a cam actuated arm 356 (Fig. 11) rotatably mounted on the cam shaft 82. The arm 356 is provided with a cam roll 358 engaging a cam 360 secured to the main shaft 16 which rotates six revolutions for each complete operation of the machine. To hold the cam roll 358 against the cam 360, a spring 362 is provided, stretched between a pin on the arm 356 and the main frame.

The tension on the cord is released at suitable times during operation of the machine by connections to the tension plate 184 comprising an inverted U-shaped arm 364 (see Figs. 4 and 11) the upper central part of which engages the rearwardly projecting flanged portions of each tension plate 184. The leg portions 370 of arm 364 are mounted loosely on a horizontal shaft 368 rotatable in the lower part of the machine. The right end of arm 364 is connected by a link 372 with a downwardly extending arm of a cam operated lever 374 fulcrumed on the shaft 55. An upwardly extending arm of the lever 374 carries a cam roll 376 held by a spring 377 (Fig. 9) in engagement with a cam 378 secured to the main six-revolution shaft 16. By this mechanism, tension on the cord is released to permit cord to be drawn from the supply while the needles are moving upwardly.

The take-up 40 comprises a pair of arms fastened to the shaft 368 by screws 366 and provided between their upper ends with a pair of parallel rods 379. The cords are carried between the rods to prevent displacement. The central part of the right arm of the take-up is connected by a link 380 with a downwardly extending arm of a lever 382 rotatable on the shaft 55, the upwardly extending arm of which lever is provided with a cam roll 384 held by a spring 386 in engagement with a cam 388 on the shaft 82. The action of the take-up 40 is such as to facilitate movement of the cords through the eyes of the needles and cause the previously formed loops of cord to be drawn tightly against the loops by the action of the loop takers.

To complete the lacing, after the final needle loops are transferred to the loop takers, the bight portion of each final loop is severed between the loop taker and the eyelets by the cutters 42 (see Figs. 73 and 74). To actuate the cutters, which are in the form of rectangular bars slidably mounted in slots 174 in the lacing frames, the upper end of each cutter bar is bent at right angles and fitted loosely within a diametrical slot formed in a horizontal rod 390 (see Figs. 9, 14 and 32). The rod 390 is supported at its right end in an upwardly extending arm of a lever 392 having an elongated hub fulcrumed loosely on the shaft 136. The left end of the rod 390 is secured to the upper end of another upwardly extending arm 394 whose hub portion is integrally connected with the hub of the lever 392 (see Fig. 10). The lever 392 carries on a downwardly extending arm a cam roll 396 engaging a cam slot 398 formed in a cam secured to the cam shaft 82.

When the machine is stopped, the positions of certain of the operating devices are changed to facilitate release of the laced upper and positioning of a new upper in place. Thus, the loop takers which, during operation of the machine, are directly above the ends of the needles, are raised by sliding the supporting rods 172 upwardly and towards the rear of the machine, the clamp jaw 36 and the individual clamping members 150 are moved downwardly from the upper to a position shown in Fig. 14, the upper clamp jaw 34 and the transverse rod 152 secured thereon are raised out of the way as shown in Fig. 11, and the needle carriers 46 are moved downwardly and outwardly in order to expose the needles.

The loop takers are raised from operating positions by the cam lever 324 (see Fig. 30) and its actuating cam on the shaft 82, which makes a complete revolution during a single operation of the machine, and the gripper jaw 36 and the individual clamping members 150 are lowered from clamping positions by their connections with their respective cams on the shaft 82. At about the same time and just before the machine comes to rest, the upper jaw 34 and the cross bar 152 are raised by the connections hereinbefore described to the arm 110, of the driving and stopping mechanism.

The driving and stopping mechanism is best shown in Figures 18 to 24. The driving pulley 24 is loosely supported at the end of the main driving shaft 16 in part by a sleeve 400 (Fig. 20) mounted to slide on the shaft and connected with the shaft by a key 402. The shaft is of reduced diameter towards its outer end, providing a shoulder 404 against which one end of a compression spring 406 rests. The other end of the spring 406 engages an internal shoulder 408 formed within the sleeve 400 between a portion of the central passage therein which slidably fits the main shaft 16 and another portion of the central passage which fits the reduced end of the shaft. Compression spring 406 thus tends to force the sleeve outwardly on the shaft.

The main driving pulley 24 is rotatable on a reduced portion of the sleeve 400 and is held in position longitudinally of the shaft by a collared bushing 410 and a washer 412 secured against a shoulder formed at the end of the shaft by a still further reduced and threaded portion of the shaft carrying a nut 414. Between the bushing and the washer is loosely mounted a collar 416 secured to the hub of the driving pulley 24 by screws 418.

Mounted within a suitable recess in the driving pulley 24 is a cup-shaped bushing 420 frictionally connected to the pulley by means of friction members 422 (see Fig. 23) riveted to a clamp ring 424 made in three sections and connected by suitable adjusting screws 426. The outer end of the bushing 420 is provided with arcuate slots 428 into which the ends of pins 430 on the sleeve 400 enter when the sleeve is moved along the shaft towards the end by the spring 406.

To connect or disconnect the sleeve 400 from the bushing 420, a vertical controlling rod 432 is provided to slide in a bracket 434 secured to the machine frame. This rod, when raised, cooperates with a cam slot 436 in the sleeve 400 to move the sleeve inwardly to bring the machine to rest. The rod is raised towards the sleeve by a spring 438 on the rod, compressed between the lower portion of the bracket 434 and a block 440 fixed to the rod. When the rod is withdrawn from the sleeve 400, the spring 406 causes the sleeve to move outwardly along the shaft and the pins 430 to enter the arcuate slots 428, establishing a driving connection between the shaft 16 and the driving pulley 24. However, the friction members 422 are so adjusted that slippage may take place between the bushing 420 and the pulley 24 as the driving shaft 16 is being brought up to speed, but sufficient friction is obtained to prevent slippage after the machine is brought up to speed. With such an adjustment, the slippage in the frictional connection will gradually decrease to zero as the shaft speed increases and reaches zero slippage when the shaft is driven at the speed of the pulley. Such a connection is not only advantageous in starting the machine, but is also advantageous when the machine, through improper adjustment or other cause, is given an excessive load, the connection permitting the drive shaft to stop without causing injury to the parts of the machine.

To bring the machine to rest with the shaft 16 at a definite angular position, there is secured to the shaft a brake drum 442 and surrounding the brake drum is a band 444 having frictional material 446 secured to its inner face. One end of the brake band is pivotally mounted on a pin 448 (Fig. 22) passing through the bifurcated end 450 of a lever 452. The lever 452 is loosely mounted on the right end of shaft 136. Also loosely mounted on the pin 448 is a lever 456 having a cam face 458 (Fig. 20) arranged to cooperate with a cam surface 460 formed at the inner end of the sleeve 400. The cam lever 456 is connected to the other end of the brake band 444 by connections comprising an adjusting screw 462 passing loosely through a swivel block 464 clamped to a pin 466 passing through the lever 456. The screw 462 is threaded into a block 470 rotatable about a pivot 468 in said other end of the brake band. The pin 466 is held in the lever 456 by a clamping bolt 472.

The diameter of the brake band is determined by adjusting the screw 462, and in order to maintain the band in concentric relation with the brake drum, two adjustable stop screws 474 and 476 are provided, on which two separate portions of the brake band rest. These stop screws and the pivotal mounting of the band on the lever 452, and the pivotal mounting of this lever itself, permit the brake band to float freely without normally touching the brake drum 442.

When it is desired to stop the machine, the control rod 432 is permitted to be lifted automatically by a spring 438 and the end of this rod engages the outer surface of the sleeve 400 until the cam slot 436 reaches such a position that the upper end of the rod will enter the slot. The shape of the cam slot is such that, upon continued rotation, the sleeve 400 is brought inwardly (to the left in Fig. 20) to disconnect the pins 430 from the slots 428, thus stopping the drive of the shaft 16 from the pulley 24. As this disconnection takes place, the cam surface 460 on the sleeve 400 has become positioned beneath the cam lever 456 so that the cam face 458 thereon starts to ride upon the cam surface 460. The cam face 458 is lifted by a gradual rise on the cam surface 460 which causes the cam lever 456 to pull on the adjusting screw 462, through the pin 466 and swivel block 464. The screw 462 pulls on the block 470 and pivot 468, to contract the brake band so that its friction material 446 engages the brake drum 442 with increasing force, to slow down the rotation of the shaft. The end of the cam surface 460 is steep to form an abutment 478 which, when it strikes the side portion of the cam face 458, stops the machine in a definite angular position. As the speed has been reduced gradually by the increasing force with which the brake band has been contracted, this final stopping at a definite angular position is without substantial shock.

When the machine is started again, by the withdrawal of the controlling rod 432 from the cam slot 436, the spring 438 in sliding the sleeve 400 to the right not only causes the pins 430 to engage the slots 428, but it also causes the cam surface 460 on the sleeve to withdraw from beneath the cam lever 456, releasing the brake, which then expands, due to the elasticity of the brake band 444 to clear the brake drum.

To draw the controlling rod 432 downwardly from the cam slot 436 in starting the machine, the block 440 on the rod carries a vertically arranged adjusting screw 480 threaded into the block with a hexagonal head extending upwardly. The arm 110 on which is rotatably mounted the roll 116 extends rearwardly of the machine to a point above the head of the screw 480 so that, when the end of the arm is forced downwardly, it abuts the screw 480 and causes the rod 432 to be depressed. The arm 110 is held in a raised position away from the head of the screw 480, while the machine is at rest, by a spring 482 coiled about the hub of the arm with one end engaging the underside of the arm and the other end an opening in the machine frame.

The treadle rod 26 is so arranged that when depressed, it will cause the arm 110 to be moved downwardly until it engages the screw 480. Thereafter, further downward movement of the arm 110 is caused automatically by connections actuated by the main driving pulley 24. On an extending flange portion of the driving pulley there is secured a circular eccentric cam 484 and pivotally mounted on a stud screw 486 threaded into the arm 110 there is a lever 488 having a cam roll 490 engaging the cam 484 so as to be oscillated continuously thereby. To hold the cam roll 490 in engagement with the cam 484, a tension spring 492 is stretched between a pin on the arm 110 and a pin on the lever 488. The end of the lever 488 opposite the roll 490 is arranged to engage a latch member 494 pivotally mounted at its lower end on a screw 496 secured in the arm 110. The latch member 494 is yieldingly held in engagement with the lever 488 during operation of the machine by a spring 498 connected between the arm 110 and the latch member. When the machine is at rest, the driving pulley 24 only is rotated, and the lever 488 is oscillated idly by the cam 484, the latch member 494 being held out of engagement with the lever 488, as shown in Figure 18.

To hold the latch member 494 out of engagement with the lever 488, a pin 500 is provided in the upper end of the latch member in a position to be engaged by a cam block 502 secured to the right side of a circular cam 504. The cam 504 is made fast to the right end of the shaft 82 which is rotated once for each complete operation of the machine. The latch member 494 is permitted to move into engagement with the lever 488 to start the machine.

After the treadle rod 26 is depressed, the pin 500 moves rearwardly beneath the lower end of the cam block 502 of the cam 504 into the position shown in Figure 19, where an upper arcuate portion of the latch may first engage the lever 488, and as the end of the lever moves downwardly, it passes beneath the shoulder on the latch. Thereafter, as the eccentric 484 rotates, the lever 488 being latched rigidly with the arm 110, the arm is moved still further downwardly, withdrawing the controlling rod 432 from the cam slot 436. The shaft 16 is then connected to the driving pulley 24 and the machine is started. The arm 110 is held down by the concentric outer surface of the cam 504 engaging the roll 116 on the arm during operation of the machine.

After the machine has completed its operations the roll 116 enters a recess 506 in the cam 504 and the controlling rod 432 is allowed to engage the cam slot 436 and stop the machine. To prevent the arm 110 from being raised immediately after starting the machine, there is loosely mounted at the end of the shaft 82 a lever 508 held on the end of the shaft by a washer and screw 510 threaded into the end of the shaft. As soon as the arm 110 is depressed by the action of the cam 484 and lever 488, the lower arcuate end of the lever 508 slides over the roll 116 under the action of a spring 511 stretched between the upper end of the lever 508 and a pin on the cam 504. The arrangement of cam 504 is such that it will depress arm 110 lower than the position to which it was moved by the oscillating lever 488. Since the driving pulley 24 makes six revolutions during one complete operation of the machine, the lever 488 will be oscillated idly below the shoulder of the latch member 494 six times during a lacing operation, the arm 110 remaining in its lowest position. Also to insure that the lever 488 will not engage the latch shoulder, the outer surface of cam 504 has a greater radius than that of the arcuate end of lever 508.

Further downward movement of the treadle rod 26 after the free end of the arm 110 contacts the head of the set screw 480 is prevented by a pin 512 passing through the rod and arranged to engage the upper surface of a boss 514 which slidably supports the rod on the machine frame.

To prevent continued operation of the machine in case the treadle rod is held in depressed position the hook member 118 is pivotally mounted at the upper end of the treadle rod permitting the hook to swing forwardly of the machine out of engagement with the roll 116. The hook member is held yieldingly in engagement with the roll by a spring 516 connected between pins on the boss 514 and on the hook member respectively. As the arm 110 is depressed and the machine started the hook member 118 is acted upon by the lever 508 to disconnect it from the roll. As the roll 116 enters the recess 506 of the cam 504 at the end of the operation, it is engaged by the advancing edge or shoulder of the lever 508 and the lever is held against rotation by the roll until the machine is again started. At the same time that the roll 116 enters the recess 506 of the cam, the block 502 acts against the pin 500 to withdraw the latch member from engagement with the lever 488 and prevent another operation of the machine.

To move the needle carriers 46 downwardly and forwardly at the end of a lacing operation, connections are arranged to act on the links 70 and 72 of the carrier jogging mechanism (see Figs. 25, 26 and 27). These connections comprise a pivot 518 forming the connection between the links 70 and 72. The pivot is secured in the upper end of a link 520 which is pivotally connected at its lower end with an arm of a lever 522 (see Figs. 6, 7 and 8) rotatably mounted on the shaft 55. The lever 522 is oscillated at the proper time near the end of the lacing operation by a lever 524 which at this time is rigidly connected to the lever and is journalled on the hub portion of the lever and provided with a cam roll 526 engaging a cam slot 528 in a cam on the cam shaft 82.

To insure that the needles will be moved into operating position in the machine as the machine is started, the lever 524 is releasably connected to the lever 522 by a slide 530 mounted in a radial groove formed in the lower end of the lever 522 between the two levers. The slide 530 is provided with a toothed shaped portion 532 engaging a notch in the lower end of the lever 524. To maintain the toothed portion 532 in engagement with the lever 524, a spring 534 is connected between a pin 536 in the arm 522 and a pin 538 in the slide 530 extending through a slot in the arm 522. As the machine is started, the slide 530 is moved out of engagement with the lever 524 to disconnect it from the lever 522, and the lever 522 is rocked in a clockwise direction by a spring 540 connected between a rearward arm of the lever 522 and the frame of the machine. To prevent the lever 522 from being moved too far, there is provided beneath the rearward arm an adjustable set screw 542 threaded into the machine frame. The upward movement of the arm 522 causes the connections previously described to raise the needle carriers to the desired operating positions and to insure the upward movement of the arm in case the spring 540 fails to bring the needle carriers into operating position in the machine, the downwardly extending arm of the lever 522 is provided with a boss 544 engaged by a projection on an arm 546 to move the needle carrier actuating connections positively. The arm 546 is secured to the left end of the shaft 55. To rock the shaft 55 in starting the machine, at the right end of the shaft, there is fixed an arm 548 (see Figs. 5 and 18) having a forked end engaging a roll 550 rotatably mounted on the block 440. When the controlling rod 432 is withdrawn from the cam slot 436, to start the machine in operation, the roll 550 rocks the arm 548 and the arm 546 secured to the shaft 55 in the desired manner.

In order to move the slide 530 out of engagement with the lever 524 on starting the machine, there is pivotally mounted at the lower end of arm 546 a trip lever 552, the forward end of which is arranged to overlie a pin 554 extending from the slide 530. The rearward end of the trip lever is provided with a roll 556 cooperating with a stationary cam block 558 on the machine frame. When the arm 546 is rocked in starting the machine, the forward end of the trip lever acts against the pin 554 to force the slide 530 away from the actuating lever 524. After the two levers are disconnected, the roll 556 is moved beyond a shoulder 560 on the cam block 558 so as to permit the levers to be again connected when the notch at the lower end of lever 524 is caused to register with the tooth shaped portion 532 of the slide. This occurs, due to the shape of the cam slot 528, shortly after the machine is started.

When the machine is at rest the parts are in the position shown in Figures 1, 4, 5 and 11 with the clamp jaw 34 raised, the needles in their outer position and the loop takers in their rearward position to facilitate applying the eyelets of the upper to the individual needles. After the upper is applied to the machine, the treadle is depressed, causing the clamp jaw 34 with the rod 152 to be lowered to the position indicated in Figures 13 and 14. As the machine is started into operation, the needles are brought to their operative position, as indicated in Figures 13 and 14, the lower clamp jaw 36 and the individual clamping members 150 are raised to clamp the upper against the under side of the upper clamp jaw 34 and bar 152, the loop takers are moved downwardly and forwardly in position to cooperate with the needle, and the needles are projected upwardly into alignment with the loop taker points. The relations of the upper to the clamping jaws and clamping members at this point are more clearly illustrated in Figure 17.

Figure 55:
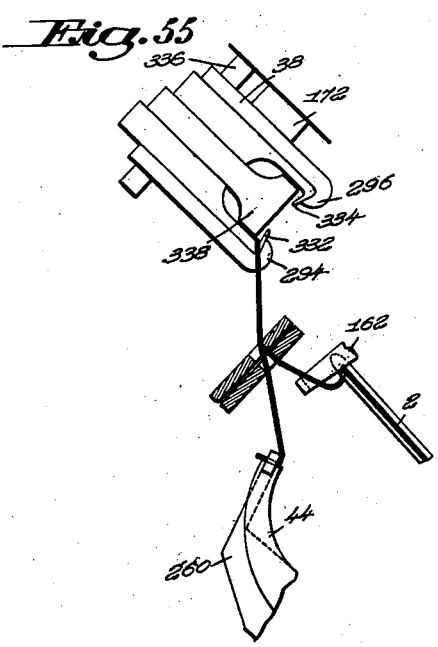
Figure 56:
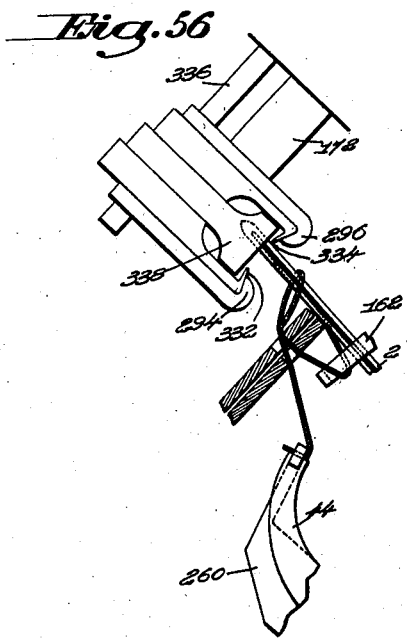
Figure 57:
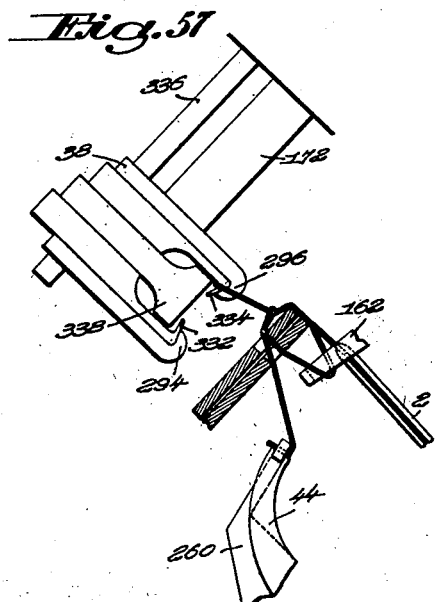
Figure 58:
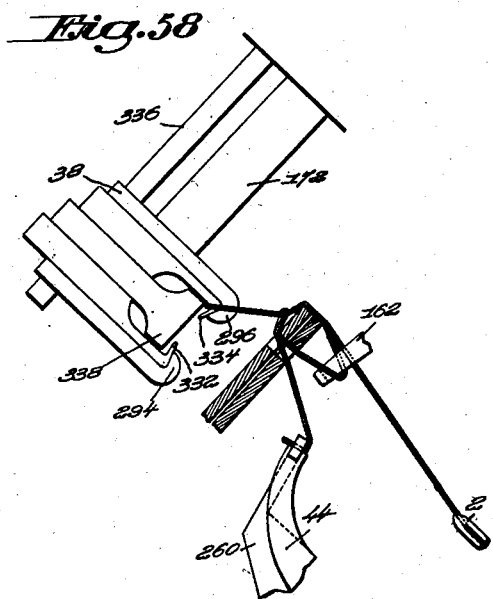
Figure 59:
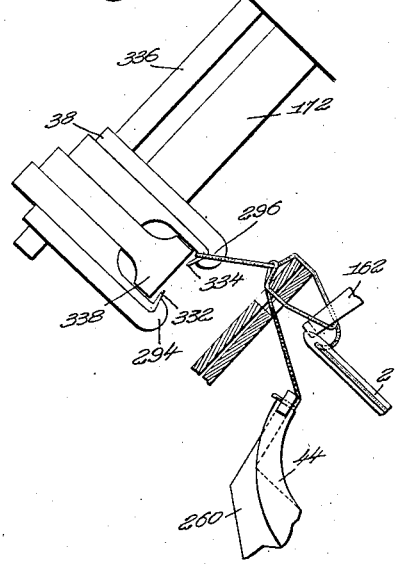
Figure 60:
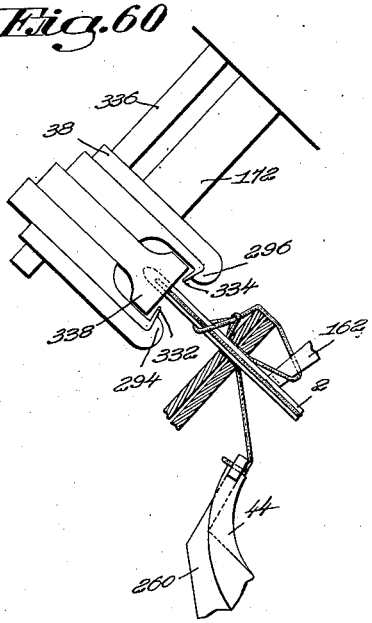
Figure 61:
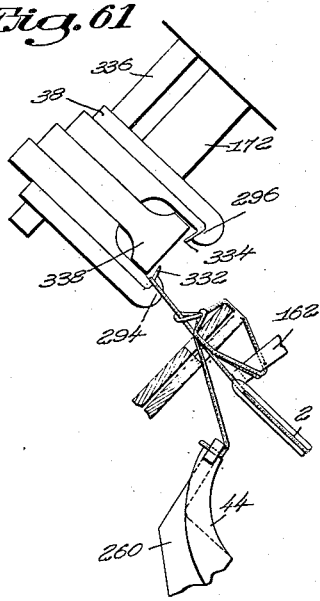
Figure 62:
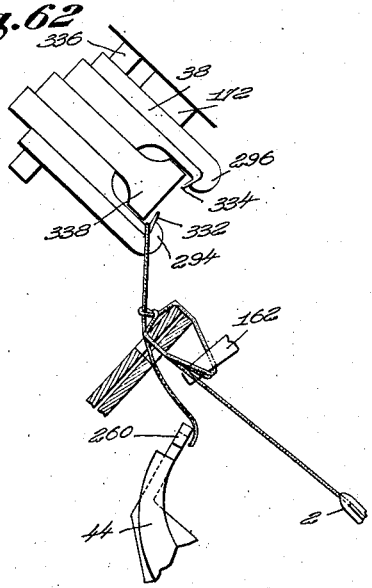

As the needles enter the loop takers, the loop takers are moved rearwardly, causing the loops of cord to be engaged and held. During the retracting movement of the needles, the first part of which is illustrated in Figure 53, the grippers 44 are moved towards the clamped upper into the position shown in Figure 54 to bring the clamped ends of the cord close to the eyelets. The needle carriers and the loop takers are raised rearwardly and the needles pass across the edges of the upper during the succeeding reciprocation, the first part of which is illustrated in Figure 55. As the needles approach the loop takers, they enter the spread loops first held by the looper and spreader points and the loop takers are then moved forwardly (Figure 56). In moving forwardly, the first loops are cast off from the loop takers by contact with the needles, the cord having been passed around the angularly disposed ends of the measuring fingers 162 to provide suitable separation in the completely laced upper and drawn tightly against the top surface of the upper by continued movements of the loopers. After the first loop is cast off the loop takers, the second loops are engaged and held thereby and the needles retracted as shown in Figure 57. Figure 58 illustrates the parts in their positions as the needles begin their third reciprocation. Just before the needles enter the eyelets in the third reciprocation, the cords are brought again around the cord measuring fingers 162, as indicated in Figure 59. To release the second loop from the loop takers (see Fig. 60), the loop taker is moved a short distance rearwardly. The loop takers then move still further rearwardly, as in Figure 61, to engage and hold the third loops of cord, the second loops being drawn tight by this movement. As the needles reach approximately their lowest positions after their third reciprocation, the cord end grippers are actuated to release the ends of cord, as in Figure 62. Thereafter, the needles complete their fourth reciprocation across the edges of the upper, indicated in the step-by-step positions of Figures 63, 64, and 65. When the needles reach the lower limits of their fourth reciprocating movement, as in Figure 66, the hook members 260 of the grippers are raised past the lengths of cord extending between the uppers and the needle eyelets, the gripper members 44 being held at the front of the cords by the rod 286. During the fifth upward movement of the needles, the hook members are held stationary (Fig. 67), and the needles pass through the fourth loops (Fig. 68). After the needles are withdrawn from the eyelets (Figs. 69 and 70) and move below the level of the grippers (Figs. 71 and 72), the hook members 260 are again lowered to a gripping position, drawing the cords with them.

At this point in the operation of the machine, the cutter knives 42 are projected forwardly and downwardly against the sides of the loops held by the loop takers between the loop takers and the eyelets, as shown in Figs. 73 and 74. As soon as the cords are cut, the lower clamping members 150 are moved downwardly to release the upper and the upper drops from the machine. As the clamping members 150 move downwardly and after the upper has dropped from the machine, they engage the underlying portions of the thread measuring fingers and force these downwardly in case the fingers have not dropped of their own weight. The downward movement of the thread measuring fingers is limited by ledges 562 projecting from the frame plates 153 (see Figs. 14 and 38).

After the lacing cords are severed, as illustrated in Figure 73, a long length of lacing cord is left projecting from the eye of each needle. To draw this length of cord backwardly through the eye of the needle and leave only a short cord end projecting beyond the jaws of the thread gripper, a sixth and final upward stroke is imparted to the needles. During this final upward stroke of the needles, the hook members 260 of the grippers are raised slightly to release the lacing cords and the upward movement of the needles causes the cord ends projecting through the eyes of the needles to the grippers to be withdrawn through the needle eyes and through the grippers until the ends are close to the grippers, as indicated in Figure 75. The cam slot 331 from which the loop takers are reciprocated is so formed that the loop takers are not actuated to engage the needle loops during the final reciprocation of the needles so that, when the needles are retracted, the loops remain on the needles. During the final downward movement of the needles the cord ends are held by the grippers and the cords are withdrawn by the take-up through the eyes of the needles which return to the position indicated in Figure 76.

As the machine stops, the needle carriers are moved downwardly and forwardly to bring them into their rest position, as indicated in Figure 77, the loop takers are moved upwardly and rearwardly to their inoperative position, and the upper clamping jaw 34 is raised to its highest position, leaving all parts of the machine ready to receive a new upper.

The nature and scope of the invention having been indicated, and a construction embodying the several features of the invention having been specifically described, what is claimed is:—

1. A machine for lacing eyeletted shoe uppers having, in combination, a plurality of needles arranged to pass a series of individual cord loops through aligned eyelets of a folded shoe upper, devices cooperating therewith, and means for actuating each needle and the devices cooperating therewith thereafter to pass cord loops alternately through the same eyelets and across the edges of the shoe upper and to pass each loop through the preceding loop of the same cord, and finally to pass a portion of the same cord through the final loop to lock the loops.

2. A machine for lacing eyeletted shoe uppers having, in combination, a plurality of needles arranged to pass a series of individual cord loops through aligned eyelets of a folded shoe upper, devices cooperating therewith, and means for actuating each needle and the devices cooperating therewith thereafter to pass a cord loop across the edges of the shoe upper and through the preceding loop of the same cord, and thereafter to pass a portion of the same cord through the same eyelets and through the second loop to lock the loops.

3. A machine for lacing eyeletted shoe uppers having, in combination, a plurality of needles arranged to pass a series of individual cord loops through aligned eyelets of a folded shoe upper, devices cooperating therewith, means for actuating each needle and the devices cooperating therewith thereafter to pass a cord loop across the edges of the shoe upper and through the preceding loop of the same cord, and thereafter to pass a portion of the same cord through the same eyelets and through the second loop to lock the loops, and means for taking up on each cord to tighten the loops.

4. In a machine for lacing eyeletted shoe uppers having a normal starting position with the needles extending through the plane of the work, the combination of, a series of needles arranged while stationary to pass through aligned eyelets of a folded shoe upper placed thereon, means arranged to be put in operation after the upper has been placed on the needles for withdrawing the needles and for thereafter imparting a plurality of reciprocations to the needles, means for relatively moving the upper and needles to cause each needle during its reciprocations to pass alternately over the edges of the upper and through a pair of aligned eyelets, and devices cooperating with the needles during their reciprocations to form a series of individual cord lacings extending through the eyelets and across the edges of the folded upper.

5. A machine for lacing eyeletted shoe uppers having, in combination, a series of needles arranged to pass through the aligned eyelets of a folded shoe upper, means for imparting a plurality of reciprocations to the needles, means for relatively moving the upper and needles to cause each needle to pass alternately over the edges of the upper and through the same pair of aligned eyelets, and devices cooperating with the needles during their reciprocations to form a series of individual cord lacings extending through the eyelets and across the edges of the folded upper.

6. In a machine for lacing eyeletted shoe uppers having a normal starting position with the needles extending through the plane of the work, the combination of, a series of needles arranged while stationary to pass through the aligned eyelets of a folded shoe upper placed thereon, means arranged to be put in operation after the upper has been placed on the needles for withdrawing the needles and for thereafter imparting a plurality of reciprocations to the needles, means for relatively moving the upper and needles to cause each needle to pass alternately over the edges of the upper and through the same pair of aligned eyelets, and devices cooperating with the needles to cause each needle to pass loops of the same cord alternately through a pair of eyelets and across the edges of the shoe upper and to pass each loop through the preceding loop.

7. A machine for lacing eyeletted shoe uppers having, in combination, a series of eye pointed needles arranged to pass through aligned eyelets of a folded shoe upper, means for imparting a plurality of reciprocations to the needles, means for relatively moving the upper and needles to cause each needle to pass loops of the same cord alternately over the edges of the upper and through the same pair of aligned eyelets, a loop taker associated with each needle, and means for actuating each loop taker to engage successively the loops presented thereto by a needle and to release each loop after it is entered by the succeeding loop.

8. A machine for lacing eyeletted shoe uppers having, in combination, an eye pointed needle arranged to pass through a pair of aligned eyelets of a folded shoe upper, means for relatively moving the upper and needle to cause the needle to pass alternately through the same eyelets and over the edges of the shoe upper, a loop taker, and means for actuating the loop taker to engage successively the cord loops formed during the needle reciprocations and to release each loop after it has been entered by the succeeding loop.

9. In a machine for lacing eyeletted shoe uppers having a normal starting position with the needles extending through the plane of the work, the combination of, a series of eye pointed needles arranged while stationary to pass through aligned eyelets of a folded shoe upper placed thereon, means arranged to be put in operation after the upper has been placed on the needles for withdrawing the needles and for thereafter imparting a plurality of reciprocations to the needles, and devices cooperating with the needles during their reciprocations to form a series of individual cord lacings extending through the eyelets and across the edges of the folded upper.

10. A machine for lacing eyeletted shoe uppers having, in combination, an eye pointed needle arranged to pass through a pair of aligned eyelets of a folded shoe upper, means for withdrawing the needle and for thereafter imparting a plurality of reciprocations to the needle, means for moving the needle transversely of its line of reciprocation to cause the needle to pass alternately through the same eyelets and over the edges of the shoe upper, a loop taker, and means for actuating the loop taker to engage successively the cord loops formed during the needle reciprocations and to cause a loop of cord formed during one reciprocation of the needle to be entered by a loop formed during a succeeding reciprocation.

11. A machine for lacing eyeletted shoe uppers having, in combination, an eye pointed needle arranged to pass through aligned eyelets of a folded shoe upper, means for imparting a plurality of reciprocations to the needle, means for relatively moving the upper and needle to cause the needle to pass loops of a cord alternately over the edges of the upper and through a pair of aligned eyelets, a loop taker provided with a loop entering point, means for actuating the loop taker to engage successively the loops presented thereto by the needle and to release each loop after it is entered by the succeeding loop, and means for controlling the position of the loop entering point with relation to the needle comprising a needle engaging member and suitable connections between said member and the loop taking point.

12. A machine for lacing eyeletted shoe uppers having, in combination, an eye pointed needle arranged to pass through aligned eyelets of a folded shoe upper, means for imparting a plurality of reciprocations to the needle, means for relatively moving the upper and needle to cause the needle to pass loops of a cord alternately over the edges of the upper and through a pair of aligned eyelets, a loop taker provided with a loop entering point, means for actuating the loop taker to engage successively the loops presented thereto by the needle and to release each loop after it is entered by the succeeding loop, means for controlling the position of the loop entering point with relation to the needle comprising a point locating device movable into engagement with the needle while the needle is in a position of loop presentation, and connections between the point locating device and the loop entering point for determining the path of movement of the point while the point locating device is in engagement with the needle.

13. A machine for lacing eyeletted shoe uppers having, in combination, an eye pointed needle arranged to pass through aligned eyelets of a folded shoe upper, means for imparting a plurality of reciprocations to the needle, means for relatively moving the upper and needle to cause the needle to pass loops of a cord alternately over the edges of the upper and through a pair of aligned eyelets, a loop taker provided with a loop entering point, means for actuating the loop taker to engage successively the loops presented thereto by the needle and to release each loop after it is entered by the succeeding loop, a carrier for the loop entering point mounted for movement transversely of its loop taking movement, a point locating device arranged to move into engagement with the needle when the needle is in loop presenting position, and connections between the point locating device and the carrier for the loop entering point for controlling the position of the loop entering point with relation to the needle while the point locating device is in engagement with the needle.

14. A machine for lacing eyeletted shoe uppers having, in combination, an eye pointed needle arranged to pass through aligned eyelets of a folded shoe upper, means for imparting a plurality of reciprocations to the needle, means for relatively moving the upper and needle to cause the needle to pass loops of cord alternately over the edges of the upper and through a pair of aligned eyelets, a loop taker provided with a loop entering point, means for actuating the loop taker to engage successively the loops presented thereto by the needle and to release each loop after it is entered by the succeeding loop, a carrier for the loop entering point movable transversely to the loop entering movement of the point, means for yieldingly moving the carrier for the loop entering point transversely of the loop entering movement of the point, a point locating device movable into engagement with the needle when the needle is in loop entering position, and a connection between the carrier for the loop entering point and the point locating device for moving the device into engagement with the needle when the needle is in loop presenting position.

15. A machine for lacing eyeletted shoe uppers having, in combination, a needle arranged to pass through the aligned eyelets of a folded shoe upper, means for imparting a plurality of reciprocations to the needle, means for relatively moving the upper and needle to cause the needle to pass alternately over the edges of the upper and through a pair of aligned eyelets, a loop taker provided with two opposed loop entering points, and means for moving the loop taker transversely of the needle movement and in timed relation to the needle movement to cause the looper points to engage alternately cord loops presented successively by the needle and to release each loop after it has been entered by the succeeding loop.

16. A machine for lacing eyeletted shoe uppers having, in combination, a needle arranged to pass through the aligned eyelets of a folded shoe upper, means for imparting a plurality of reciprocations to the needle, means for relatively moving the upper and needle to cause the needle to pass alternately over the edges of the upper and through a pair of aligned eyelets, a loop taker provided with a loop holding point and a loop spreading point, means for moving the looper transversely to the direction of the needle movement to cause first the loop spreading point and thereafter the loop holding point to engage a cord loop presented by the needle, and means for moving the loop spreading point to spread the loop in the path of the needle during a succeeding reciprocation.

17. A machine for lacing eyeletted shoe uppers having, in combination, a needle arranged to pass through the aligned eyelets of a folded shoe upper, means for imparting a plurality of reciprocations to the needle, means for relatively moving the upper and needle to cause the needle to pass alternately over the edges of the upper and through a pair of aligned eyelets, a loop taker provided with two opposed loop entering points, and means for moving the loop taker transversely of the needle movement and in timed relation to the needle movement to cause the looper points to engage alternately cord loops presented successively by the needle and to release each loop after it has been entered by the succeeding loop, and means for controlling the position of the loop entering points with relation to the needle comprising a guide engaging the needle between the looper points.

18. A machine for lacing eyeletted shoe uppers having, in combination, an eye pointed needle arranged to pass through aligned eyelets of a folded shoe upper, means for imparting a plurality of reciprocations to the needle, means for relatively moving the upper and needle to cause the needle to pass loops of the cord alternately over the edges of the upper and through a pair of aligned eyelets, a loop taker provided with a loop entering point, means for actuating the loop taker to engage successively the loops presented thereto by the needle and to release each loop after it is entered by the succeeding loop, a carrier for the loop entering point movable transversely to the loop entering movement of the point, means for yieldingly moving the carrier for the loop entering point transversely of the loop entering movement of the point, and a point locating device movable into engagement with the needle and arranged while in engagement with the needle to act as a stop to limit the yielding movement of the carrier for the loop entering point.

19. A machine for lacing eyeletted shoe uppers having, in combination, an eye pointed needle arranged to pass through a pair of aligned eyelets of a folded shoe upper, means for relatively moving the upper and needle to cause the needle to pass alternately through the same eyelets and over the edges of the shoe upper, a loop taker, and means for actuating the loop taker to engage successively the cord loops formed during the needle reciprocations and to tighten a previously formed loop during a continued loop taking movement.

20. A machine for lacing eyeletted shoe uppers having, in combination, an eye pointed needle arranged to pass through a pair of aligned eyelets of a folded shoe upper, means for relatively moving the upper and needle to cause the needle to pass alternately through the same eyelets and over the edges of the shoe upper, a loop taker, and means for actuating the loop taker to engage successively the cord loops formed during the needle reciprocations and to release and tighten each loop after it has been entered by the succeeding loop.

21. A machine for lacing eyeletted shoe uppers having, in combination, a series of needles arranged to pass through the aligned eyelets of a folded shoe upper, means for imparting a plurality of reciprocations to the needles, means for relatively moving the upper and needles to cause each needle to pass alternately over the edges of the upper and through the same pair of aligned eyelets, devices cooperating with the needles to form a series of individual cord lacings extending through the eyelets and across the edges of the folded upper, and means for producing a predetermined amount of slack in the lacings sufficient to permit opening out of the upper for application to a last.

22. A machine for lacing eyeletted shoe uppers having, in combination, a series of needles arranged to pass through the aligned eyelets of a folded shoe upper, means for imparting a plurality of reciprocations to the needles, means for relatively moving the upper and needles to cause each needle to pass alternately over the edges of the upper and through a pair of aligned eyelets, devices cooperating with the needles to form a series of individual cord lacings extending through the eyelets and across the edges of the folded upper, measuring fingers over which the cord is passed by the needles for producing sufficient slack in the lacings to permit opening out of the upper for application to a last.

23. A machine for lacing eyeletted shoe uppers having, in combination, a series of needles arranged to pass through the aligned eyelets of a folded shoe upper, means for imparting a plurality of reciprocations to the needles, means for relatively moving the upper and needles to cause each needle to pass alternately over the edges of the upper and through the same pair of aligned eyelets, devices cooperating with the needles to form a series of individual cord lacings extending through the eyelets and across the edges of the folded upper, and means for producing a predetermined amount of slack in the lacings sufficient to permit opening out of the upper for application to a last adjustable to vary the lengths of the lacings.

24. A machine for lacing eyeletted shoe uppers having, in combination, a series of needles arranged to pass through the aligned eyelets of a folded shoe upper, means for imparting a plurality of reciprocations to the needles, means for relatively moving the upper and needles to cause each needle to pass alternately over the edges of the upper and through the same pair of aligned eyelets, devices cooperating with the needles to form a series of individual cord lacings extending through the eyelets and across the edges of the folded upper, and means for producing a predetermined amount of slack in the lacings sufficient to permit opening out of the upper for application to a last adjustable to vary the lengths of the lacings progressively from one end of the series to the other.

25. A machine for lacing eyeletted shoe uppers having, in combination, a series of needles arranged to pass through the aligned eyelets of a folded shoe upper, means for imparting a plurality of reciprocations to the needles, means for relatively moving the upper and needles to cause each needle to pass alternately over the edges of the upper and through a pair of aligned eyelets, devices cooperating with the needles to form a series of individual cord lacings extending through the eyelets and across the edges of the folded upper, measuring fingers over which the cord is passed by the needles for producing sufficient slack in the lacing to permit opening out of the upper for application to a last, an abutment against which the fingers are drawn by the cords, and means for adjusting the abutment to vary the amount of slack produced by the fingers.

26. A machine for lacing eyeletted shoe uppers having, in combination, a series of needles arranged to pass through the aligned eyelets of a folded shoe upper, means for imparting a plurality of reciprocations to the needles, means for relatively moving the upper and needles to cause each needle to pass alternately over the edges of the upper and through a pair of aligned eyelets, devices cooperating with the needles to form a series of individual cord lacings extending through the eyelets and across the edges of the folded upper, measuring fingers over which the cord is passed by the needles for producing sufficient slack in the lacing to permit opening out of the upper for application to a last, an abutment against which the fingers are drawn by the cords, and means for adjusting the abutment to vary the amount of slack produced by the fingers progressively from one end of the series of lacings to the other.

27. A machine for lacing eyeletted shoe uppers having, in combination, a plurality of eye pointed needles arranged to pass a series of individual cord loops through aligned eyelets of a folded shoe upper and across the edges of the upper, means for imparting a plurality of reciprocations to the needles, devices cooperating with each needle to cause successively formed loops to pass through the preceding loop, a cord end gripper associated with each needle to hold the end of the cord while the lacing is being formed by the loops, means for actuating the gripper to release the cord end after the formation of the lacing by the loops and to grip the cord between the eye of the needle and the lacing, and means for thereafter severing the cord between the gripper and the lacing.

28. A machine for lacing eyeletted shoe uppers having, in combination, a plurality of eye pointed needles arranged to pass a series of individual cord loops through aligned eyelets of a folded shoe upper and across the edges of the upper, means for imparting a plurality of reciprocations to the needles, devices cooperating with each needle to cause successively formed loops to pass through the preceding loop, a cord end gripper associated with each needle to hold the end of the cord while the lacing is being formed by the loops, means for actuating the gripper to release the cord end after the formation of the lacing by the loops and to grip the cord between the eye of the needle and the lacing, means for thereafter severing the cord between the gripper and the lacing, means for actuating the gripper to release and again grip the cord, and means for reciprocating the needle while the cord is released to retract cord through the gripper to bring the severed end close to the gripper.

29. A machine for lacing eyeletted shoe uppers having, in combination, a plurality of needles arranged to pass a series of individual cord loops through aligned eyelets of a folded shoe upper and across the edges of the upper, means for imparting a plurality of reciprocations to the needles, devices cooperating with each needle to cause successively formed loops to pass through the preceding loop, and means acting prior to the stopping of the machine to sever each cord in the bight of a loop to separate the individual lacings from the supply.

30. A machine for lacing eyeletted shoe uppers having, in combination, a plurality of eye pointed needles arranged to pass a series of individual cord loops through aligned eyelets of a folded shoe upper and across the edges of the upper, means for imparting a plurality of reciprocations to the needles, a loop taker and spreader associated with each needle, means for actuating each loop taker and spreader to engage and spread successively the loops presented thereto by a needle, and to release each loop after it is entered by the succeeding loop, and means acting prior to the stopping of the machine to sever each cord in a spread loop to separate the completed lacings from the supply.

31. A machine for lacing eyeletted shoe uppers having, in combination, a series of needles arranged while stationary to extend through aligned eyelets of a folded shoe upper placed thereon, means for holding the upper in position after being placed on the needles comprising a clamping member to engage one side of the upper, a series of individual clamping members to engage the other side of the upper, means for relatively actuating said clamping members to engage and hold the upper, means for imparting a plurality of reciprocations to the needles, devices cooperating with the needles to form a series of individual cord lacings extending through the eyelets and across the edges of the folded upper, and means for rendering inoperative one or more of said individual clamping members.

32. A machine for lacing eyeletted shoe uppers having, in combination, a series of eye pointed needles arranged while stationary to pass through aligned eyelets of a folded shoe upper placed thereon, means operating upon starting the machine to move the needles from a position in which the upper may be readily placed thereon to operating position, and means for thereafter withdrawing the needles for imparting a plurality of reciprocations to the needles, and devices cooperating with the needles during their reciprocations to form a series of individual cord lacings extending through the eyelets and across the edges of the folded upper.

33. A machine for lacing eyeletted shoe uppers having, in combination, a series of eye pointed needles arranged while stationary to pass through aligned eyelets of a folded shoe upper placed thereon, means for withdrawing the needles and for thereafter imparting a plurality of reciprocations to the needles, devices cooperating with the needles during their reciprocations to form a series of individual cord lacings extending through the eyelets and across the edges of the folded upper, and operating on stopping the machine to move the needles from their operating position to a position in which the upper may be readily placed on the needles.

34. A machine for lacing eyeletted shoe uppers having, in combination, an eye pointed needle arranged while stationary to pass through aligned eyelets of a folded shoe upper placed thereon, means for withdrawing the needle and for thereafter imparting a plurality of reciprocations to the needle, means for relatively moving the upper and needle to cause the needle to pass loops of a cord alternately over the edges of the upper and through a pair of aligned eyelets, a loop taker, means for actuating the loop taker to engage successively the loops presented thereto by the needle and to release each loop after it is entered by the succeeding loop, and means operating on stopping the machine to move the loop taker away from the needle to a position in which the upper may be readily placed on the needle.

35. A machine for lacing eyeletted shoe uppers having, in combination, an eye pointed needle arranged while stationary to pass through aligned eyelets of a folded shoe upper placed thereon, means for withdrawing the needle and for thereafter imparting a plurality of reciprocations to the needle, means for relatively moving the upper and needle to cause the needle to pass loops of a cord alternately over the edges of the upper and through a pair of aligned eyelets, a loop taker, means for actuating the loop taker to engage successively the loops presented thereto by the needle and to release each loop after it is entered by the succeeding loop, and means operating on starting the machine to move the loop taker to operating position from a position of rest away from the needles in which the upper may be readily placed on the needle.

JOSEPH FOSSA.